US011475207B2

(12) United States Patent
Xie et al.

(10) Patent No.: US 11,475,207 B2
(45) Date of Patent: Oct. 18, 2022

(54) SUBJECT LINE TESTER

(71) Applicant: salesforce.com, inc., San Francisco, CA (US)

(72) Inventors: Kexin Xie, San Mateo, CA (US); Gokhan Cagrici, Gilroy, CA (US); Daniel Keith Wilson, San Francisco, CA (US); Shrestha Basu Mallick, San Francisco, CA (US); Jonathan Daniel Showers Belkowitz, Brooklyn, NY (US); Jason Lestina, San Francisco, CA (US); James Brewer, Indianapolis, IN (US); Daniel Louis Gasperut, Indianapolis, IN (US); Jeffery Allen Zickgraf, Indianapolis, IN (US); Greg Lyman, Jacksonville, IL (US); Michael Ronald Brewer, Somers, MT (US); Evan Black, Carmel, IN (US); Austin Rauschuber, Hamden, CT (US); Victoria Schultz, Indianapolis, IN (US); Matthew David Trepina, Westfield, IN (US); Peter Stadlinger, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 143 days.

(21) Appl. No.: 16/901,656

(22) Filed: Jun. 15, 2020

(65) Prior Publication Data
US 2021/0157974 A1 May 27, 2021

Related U.S. Application Data
(60) Provisional application No. 62/938,949, filed on Nov. 21, 2019.

(51) Int. Cl.
G06F 40/166 (2020.01)
G06N 20/00 (2019.01)
(Continued)

(52) U.S. Cl.
CPC .......... G06F 40/166 (2020.01); G06F 40/216 (2020.01); G06N 20/00 (2019.01); H04L 51/52 (2022.05)

(58) Field of Classification Search
None
See application file for complete search history.

(56) References Cited

U.S. PATENT DOCUMENTS 8,924,326 B2 * 12/2014 Arquette ................. H04L 51/32
706/45
9,264,391 B2 * 2/2016 Castera .................... H04L 51/32
(Continued)

Primary Examiner — Nafiz E Hoque
(74) Attorney, Agent, or Firm — Holland & Hart LLP

(57) ABSTRACT

Methods, systems, and devices supporting data processing are described. In some systems, a data processing platform may support communication message analysis using machine learning. For example, a system may receive a set of communication messages (e.g., social media messages) and perform a machine learning process on the message contents and message interaction data to train a machine learned model. The system may further receive a subject line for a communication message for analysis, input the subject line into the machine learned model, and receive, as an output of the machine learned model, an engagement score based on the subject line. The engagement score may indicate an estimated probability that a user receiving the communication message opens the communication message (e.g., based on the subject line). A user—or the system—may modify the subject line based on the analysis to improve the engagement score.

20 Claims, 15 Drawing Sheets

(51) Int. Cl.
   *G06F 40/216*   (2020.01)
   *H04L 51/52*   (2022.01)

(56) References Cited

U.S. PATENT DOCUMENTS

| | | | | |
|---|---|---|---|---|
| 2015/0350144 | A1* | 12/2015 | Zeng | H04L 51/02 709/206 |
| 2018/0052850 | A1* | 2/2018 | Chatterjee | H04L 51/32 |
| 2021/0004437 | A1* | 1/2021 | Zhang | G06N 3/0454 |
| 2021/0294978 | A1* | 9/2021 | Chhaya | G06N 3/0445 |

* cited by examiner

SUBJECT LINE TESTER

CROSS REFERENCE

The present application for patent claims the benefit of U.S. Provisional Patent Application No. 62/938,949 by XIE et al., entitled "EMAIL SUBJECT LINE TESTER," filed Nov. 21, 2019, assigned to the assignee hereof, and expressly incorporated by reference herein.

FIELD OF TECHNOLOGY

The present disclosure relates generally to database systems and data processing, and more specifically to a subject line tester.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, a cloud platform may support email marketing. For a marketing campaign, a user or system may send a number of communication messages (e.g., emails) to a set of end users. The success of the campaign may depend on how the end users interact with the communication messages; for example, a successful campaign may correspond to a relatively high user interaction rate with the communication messages, where user interaction may be measured based on whether a user opens a message, responds to a message, performs a specific action based on a message, or the like.

Oftentimes, a user may decide how to interact with a message based on the subject line of the message (e.g., an email subject line). As such, selecting an engaging subject line for a message may significantly impact the effectiveness of the message. However, analyzing content associated with messages (e.g., an email subject line or other message contents) may involve A/B testing or other time consuming and manual techniques. Furthermore, a cloud platform may fail to store enough email subject line information to perform accurate analysis on the effectiveness of different email subject lines (e.g., due to privacy constraints associated with storing emails, due to the limited scope of emails sent or received by a particular cloud platform, or both).

DETAILED DESCRIPTION

Figure 1:
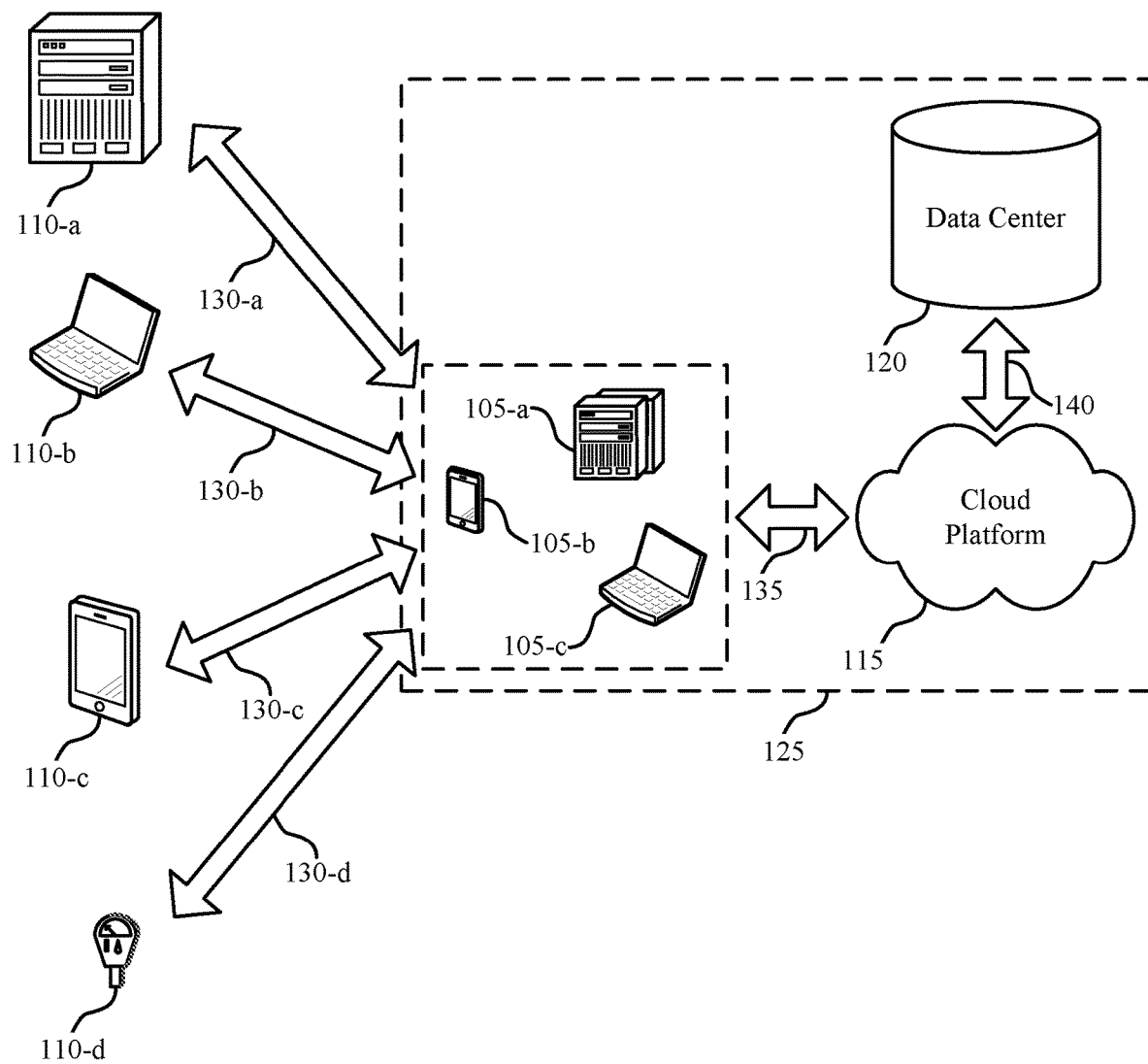
FIG. 1 illustrates an example of a system for cloud computing that supports a subject line tester in accordance with aspects of the present disclosure.

In some systems (e.g., cloud-computing systems), a user or system may send a number of communication messages, such as emails, to a set of end users (e.g., in a marketing campaign). The success of the communication messages (e.g., and, correspondingly, the marketing campaign) may depend on how the end users interact with the communication messages; for example, a successful campaign may correspond to a relatively high user interaction rate with the communication messages. User interaction may be measured based on whether a user opens a message, responds to a message, performs a specific action based on a message, or the like. In some cases, a user may decide how to interact with a message based on the subject line of the message (e.g., an email subject line). As such, selecting an engaging subject line for a message may significantly impact the effectiveness of the message. However, analyzing content associated with messages (e.g., an email subject line or other message contents) may involve time consuming and manual techniques that are prone to human bias. Furthermore, a cloud platform may fail to store enough email subject line information to perform accurate analysis on the effectiveness of different email subject lines (e.g., due to privacy constraints associated with storing emails, due to the limited scope of emails sent or received by a particular cloud platform, or both).

To effectively analyze communication messages and predict user engagement, a system (e.g., a cloud-computing system) may implement a machine learning process. The system may leverage a machine learned model to analyze text from communication messages (e.g., subject lines from emails, text from push notifications, etc.), score a predicted performance of the text, and/or suggest changes to the text. The system may support a user interface for testing different versions of a subject line, receiving feedback in the form of scores, and updating the subject lines. In some cases, the system may involve coordinating between two disparate systems (e.g., a marketing system configured for building marketing content and an analytics system configured for performing machine learning analytics). The coordination may involve authenticating a user or user session between the two systems.

In some examples, the system may train the machine learned model on social media messages. For example, the system may support accessing a large number of social media messages spanning a wide variety of technologies, industries, etc. As such, the available corpus of social media messages may support more accurate machine learning than an available corpus of emails. Additionally or alternatively, the system may use social media information in methods or functions that email messages may not support (e.g., based on data privacy regulations). In some examples, the system may additionally apply one or more techniques to support mapping from social media language resulting in positive user interaction to email subject line language resulting in positive user interaction. In some cases, the system may initially train the model on social media messages but may update the model based on feedback from sent emails (e.g., whether users open the emails, respond to the emails, etc.). The machine learned model may mitigate human biases while supporting mapping from one message platform (e.g., social media) to another message platform (e.g., business emails).

Aspects of the disclosure are initially described in the context of an environment supporting an on-demand database service. Additional aspects of the disclosure are described with reference to systems, architectures, and user interfaces that support a subject line tester. Aspects of the disclosure are further illustrated by and described with reference to apparatus diagrams, system diagrams, and flowcharts that relate to a subject line tester.

FIG. 1 illustrates an example of a system 100 for cloud computing that supports a subject line tester in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The subsystem 125 may support an application, machine learning models, and a user interface for analyzing communication messages. For example, the subsystem 125 may support training a machine learning model to predict engagement metrics for communication messages (e.g., emails or other types of messages). In some cases, the subsystem 125 may receive subject lines for a set of communication messages (e.g., email messages, push notifications, or similar marketing content) and may perform a machine learning process on the set of subject lines and respective message open rate data corresponding to the set of communication messages to generate a machine learned model. Additionally or alternatively, the subsystem 125 may use social media data (e.g., representing a significantly larger and more varied corpus of messages than subject line information for a cloud computing platform) to generate a machine learned model. The subsystem 125 may apply one or more techniques to extrapolate subject line analysis from a corpus of social media messages (e.g., based on contents and interaction data for the social media messages). Using a trained machine learning model, the subsystem 125 may receive a subject line for a communication message for analysis, input the subject line into the machine learned model, and receive, as an output of the machine learned model, an engagement score based on the subject line, where the engagement score indicates an estimated probability that a user receiving the communication message opens the communication message.

In some other systems, email subject line information may be analyzed manually to estimate the effectiveness of an email. However, such analysis may be subject to human bias. Furthermore, using email subject line information to analyze email subject line effectiveness may fail to produce accurate results due to a limited corpus of emails available for analysis, due to available emails being specific to particular use cases, or both. For example, a large portion of emails may be unavailable for analysis due to privacy regulations. Additionally, available public corpuses of emails may be related to specific industries, specific organizations, or the like, limiting the insights that can be gained from analyzing such emails. Accordingly, these other systems may produce inaccurate or incomplete analytics related to subject lines when attempting to predict how users will engage with an email.

In contrast, the system 100 may use social media messages to create a robust machine learning model for analyzing subject lines. By using social media messages (e.g., as opposed to historic email subject line information), the system 100 may significantly increase the amount of data available for analysis, the scope of the data available for analysis, or both. For example, social media data may span across industries and organizations while also being publicly available for analysis. Social media data may further inherently include user interaction data that may map to how users may interact with other types of messages, such as emails. Accordingly, the system 100 may train a machine learning model on a relatively large corpus of data using social media messages and may use the trained model to predict engagement scores for subject lines. Using a machine learning model may mitigate human bias associated with subject line analysis. In some cases, the system 100 may use feedback information for email communications to further tune and improve the accuracy of the trained model (e.g., as it applies to email subject lines).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
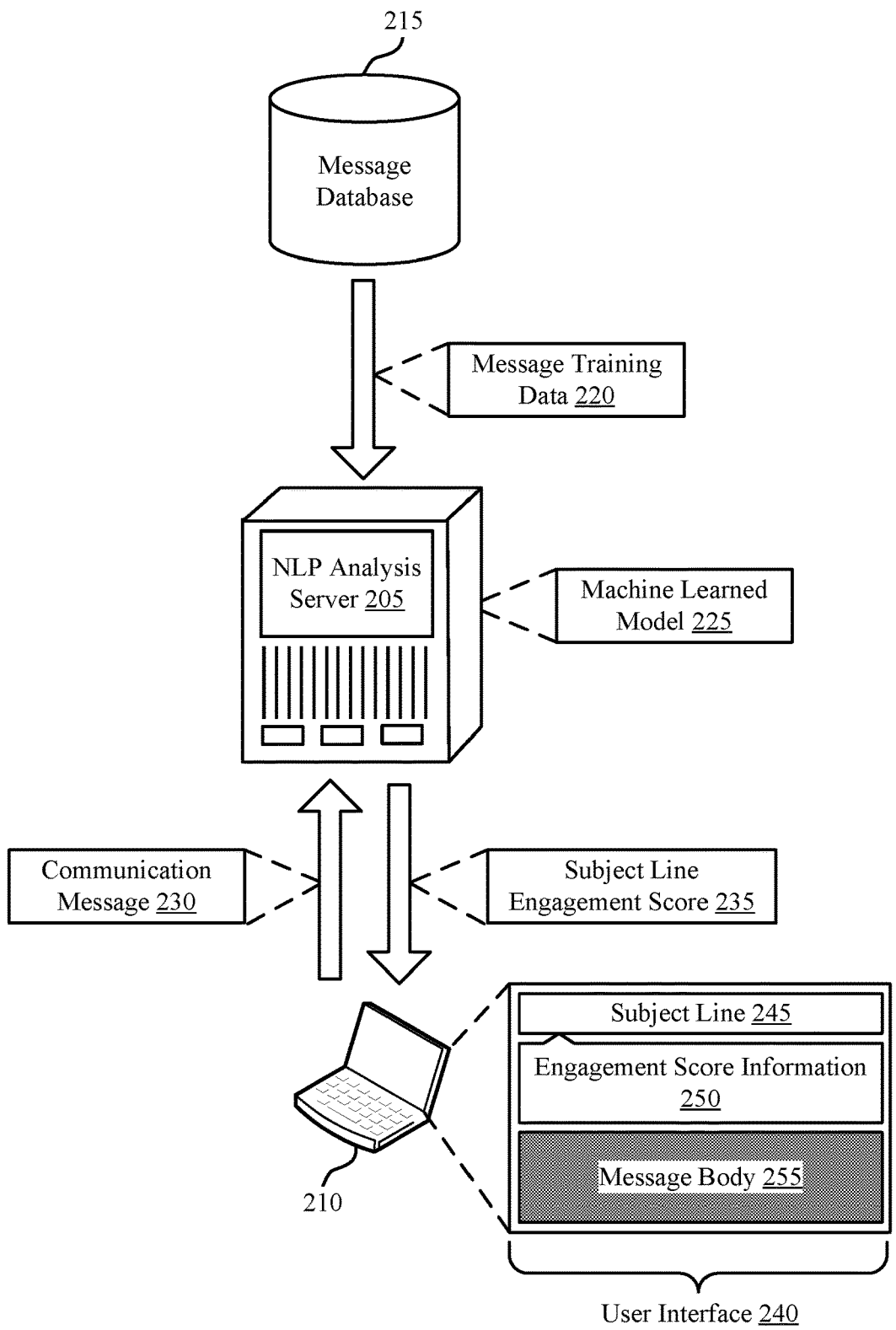
FIGS. 2 and 3 illustrate examples of systems that support a subject line tester in accordance with aspects of the present disclosure.

FIG. 2 illustrates an example of a system 200 that supports a subject line tester in accordance with aspects of the present disclosure. System 200 may include a natural language processing (NLP) analysis server 205 in communication with a user device 210 and a message database 215. Message training data 220 may be sent from message database 215 to NLP analysis server 205 to train a machine learned model 225. For example, training data 220 may include communication messages, social media messages, etc. The communication messages may include one or more respective subject lines. The NLP analysis server 205 may perform a machine learning process on the message training data 220 (e.g., respective subject lines and message open rate data corresponding to a set of communication messages, respective contents and user interaction data corresponding to a set of social media messages, or some combination thereof) to generate a machine learned model 225.

The NLP analysis server 205 may receive one or more communication messages 230 from user device 210. The NLP analysis server 205 may be an example of a single server, a server cluster, a virtual machine, a cloud-based service, or any combination of these or other devices or systems supporting data processing. A communication message 230 may be for analysis by the NLP analysis server 205, and the communication message 230 may include a subject line (e.g., subject line 245). The NLP analysis server 205 may input the subject line into the machine learned model 225. An engagement score may be received (e.g., subject line engagement score 235) as output from the machine learned model 225, the engagement score based on the subject line, where the engagement score indicates an estimated probability that a user receiving the communication message 230 opens up the communication message 230. A user interface 240 at user device 210 may support viewing of the analyzed subject line 245, received engagement score information 250, and a corresponding message body 255 corresponding to an email or similar marketing message. The user interface 240 may support displaying a list of recently scored subject lines.

In some examples, the user device 210 may receive, as additional output from the machine learned model 225, a suggested change to the subject line 245. For example, the suggested change may be to change a word or phrase, add a word or phrase, remove a word or phrase, add icons or other content, or any combination thereof. In some examples, the user may input an indication of selecting the suggested change to the subject line and the user device 210 may automatically transmit the communication message including an updated subject line based on the subject line and the suggested change to the subject line.

The communication message 230 may be transmitted to a user (e.g., a target customer), and the system 200 may receive feedback information indicating whether the communication message 230 is opened by the user. The NLP analysis server 205 may update the machine learned model 225 based on the received feedback information.

The NLP analysis server 205 may support a service (e.g., referred to as a language insights (LI) service). The LI service may be used to serve and accept data from an insights compute process for subject line analysis. Such techniques may additionally or alternatively be used for analyzing other types of text (e.g., copy from an email body or other text associated with marketing materials, for example).

The LI service may support an application programming interface (API) service, and that API service may support retrieval of subject line insights and sending of aggregates and open rate data for an insights dashboard. The API service may also support retrieval of high-level aggregates, such as information related to total subject lines, sends, open rate, etc. for a specific marketing identifier (MID). A MID may correspond to a specific user, tenant, or marketing campaign supported by a marketing cloud platform. In some cases, the MID may be associated with an account member for the marketing cloud platform.

The LI service may support workers (e.g., systems, hardware, and/or clusters that perform tasks associated with analyzing and scoring subject lines as well as supporting a user interface 240), such as worker servers operating according to one or more threads and/or transactions. The NLP analysis server 205 may include one or more LI service support workers. These LI workers may support subscription, consumption, and persistence of subject line insights, sending of aggregates, and open rate data for an insights dashboard from a compute data bus. An LI insight worker may also support subscription, consumption, and persistence of high-level aggregates (e.g., total subject lines, sends, open rate, or some combination thereof for a given MID for the insights dashboard).

The LI service may support a configuration service. The configuration service may support a setup application for a marketing analysis platform to register activation status of an LI application at an MID level. The LI configuration service may also support LI compute jobs to retrieve organization (e.g., an organization corresponding to a specific enterprise identifier (EID)) information (EID:MID combo) for customers who have enabled and activated LI applications. The LI configuration service may also support retrieval and updating of compute statuses.

An example of an insights activities process is described. In some cases, additional or alternative operations may be performed. Furthermore, operations may be performed in a different order than described. First, LI compute source data may be provided by a Data Factory Utility (DFU) data service. This data transfer may be initialized when the LI (e.g., analytics platform application) is provisioned in Manage resources. Second, LI compute resources may call the LI-Insights configuration application for configuration EID data. This process may be performed on a periodic (e.g., daily) basis, returning a list of all configured MIDs. Third, an LI-Insights worker may be subscribed to a message-queueing software bus (e.g., a rabbitmq bus). When new compute values are posted for datapoints, these new values may be persisted to a shared database (e.g., a shared postgreSQL database). Fourth, the LI-Insights Scala API may provide a RESTful API to support MID-specific retrieval of insights data to fulfill widget design by calls from the LI-Insights user interface application.

An example of a configuration activities process is described. In some cases, additional or alternative operations may be performed. Furthermore, operations may be performed in a different order than described. First, an LI-configuration service Setup Application may be enabled when the LI Application is provisioned in Manage resources. This may present a user with the setup application in an administrative view. Second, the LI-configuration may provide a RESTful API to allow the enablement of a particular MID. Enabled data may be persisted that can inform the LI Compute service for which MIDs to calculate insights. Third, configured MID information may be stored by an LI Service REST API in a table, which may include EIDs, MIDs, and/or activation statuses for the application.

An example authentication process is described for authenticating a user interface. In some cases, additional or alternative operations may be performed. Furthermore, operations may be performed in a different order than described. An activate APIs service may be setup to be called from a marketing analytics platform (e.g., which may be referred to as marketing cloud (MC)) and may use MC single sign-on (SSO) authentication (e.g., using token authentication, such as JavaScript object notation (JSON) web token (JWT) authentication). A data structure store or database cache may be used to integrate MC SSO authentication and track user sessions with the database cache (e.g., Redis). One or more helper functions may be used to fetch attributes such as the EID, MID, user identifier, tenant identifier, etc.—or attributes associated with one or more of these identifiers—from a session (e.g., tied to a JWT) to be used in an implementation of one or more APIs. The MC setup application or the page that hosts the dashboard inline-frame (iFrame) may POST the JWT to a login uniform resource locator (URL) that may establish the authentication and set up a session for the user.

Service-to-service authentication may include static API key authentication to handle communications between compute resources, the provisioner service, and the LI service. The key may be checked in as a configuration for the application, and the authentication service may use similar code as a send time optimization (STO) application of the MC service uses for service-to-service authentication (e.g., the code may be extracted as a library from the STO application and used for the key authentication service).

The system may support service REST endpoints for configuration.

The following STATUS APIs may be supported:
1. Login
2. Logout
3. Dev-Login
4. POST Activations MID
5. GET Activations The system 200 may support a number of endpoints (e.g., APIs or other connections) to provide specific functionality. Each endpoint may be implemented by a specific server, service, or system. The system 200 may support an endpoint that activates an LI feature for the organization (e.g., a tenant in a multi-tenant database system) of a user (e.g., using POST/config/v1/activations). When the LI feature has been previously activated for the user, the API may return a "200 OK" code instead of a "201 CREATED" code to indicate that the server-side is unchanged.

The system 200 may support an endpoint that returns an activation object for the organization (e.g., the tenant) of the user (e.g., using GET/config/v1/activations).

The system 200 may support service REST endpoints for an LI API. The API may be used by the LI dashboard to query the LI service for the top-used subject lines 245 and their affinities. In some cases, the API may not return any subject lines if the database, machine learned model 225, or both are not yet ready for an MID request.

The system 200 may support an endpoint that retrieves the LI subject line insights data for the organization (e.g., the tenant) of a current user (e.g., GET/insights/v1/subject/?view=[TopPerforming|MostUsed]). For example, the data may include up to a threshold number of subject lines 245 (e.g., thirty subject lines), average open rate information for the communication messages corresponding to the subject lines 245, total messages sent information, or a combination thereof. An empty response body for the LI subject line insights data request may indicate that no data is available for a specific MID.

The system 200 may support an endpoint that receives LI subject line insights statistics data for the organization (e.g., the tenant) of the current user. The statistics data may be related a total number of sends, an average open rate for the sends, or some combination for a set of emails (e.g., using GET/insights/v1/subject/totalStats).

The system 200 may support an endpoint that receives LI language features data for the organization (e.g., the tenant) of the current user (e.g., using GET/insights/v1/language/). This endpoint may return metadata for the requested data, subject line length aggregation, and/or a static list of language features, which may include the name of each feature, a total count of subject lines having the feature, a numeric or graphical icon indicating impact of the feature, or a combination thereof.

The system 200 may support an endpoint that receives LI voice property data for the organization (e.g., the tenant) of the current user (e.g., GET/insights/v1/voice/). The voice property data may include a list of emotions (e.g., a static or dynamic list of emotional properties), a total count of subject lines having each property, a numeric value indicating impact of property, or a combination thereof.

The system 200 may support an endpoint that receives LI insight data for phrase usage for the organization (e.g., the tenant) of the current user (e.g., using GET/insights/v1/phrases/?ngramLength[1,2,3]&?view[TopPerforming|MostUsed]). The data related to phrase usage may include a number of phrases (e.g., a list of ten phrases), a total count of subject lines having each phrase, a numeric value indicating impact of each phrase, or a combination thereof.

The system 200 may support an endpoint that posts a subject line to be scored. The resultant payload for the subject line scoring may be a score response or an errorcode. In some examples, the API may support a collection of subject lines to score (e.g., POST/insights/v1/tester).

In some cases, the system 200 may support one or more compute routes. The system may support an endpoint that receives EID-MID combinations that are activated. A boolean value (e.g., "isEU") may return configured EIDs for specific server stacks, such as stacks located in the European Union (EU) (e.g., with S50 internet protocol (IP) addresses, using GET/config/v1/organizations?isEU=[true|false]).

The system 200 may support one or more LI workers. A worker may be deployed from the same codebases with the "DIsWorker session" set to true. This parameter may control whether the reader is enabled or not. For example, the LI insight worker may support subscription, consumption, persistence, or some combination thereof of subject line insights, send aggregates, and/or open rate data for an insights dashboard from a compute data bus. Additionally or alternatively, an LI insights worker may support subscription, consumption, persistence, or some combination thereof of high-level aggregates (e.g., total subject lines, sends, open rate by MID for the insights dashboard). A play task may read off a bus (e.g., the compute rabbitmq bus) and may persist these structures at the EID level.

The system 200 may support a user interface 240 for inputting subject lines 245 and for reporting the results of the machine learning analysis. For example, the user interface 240 may display a score as a number, a graphical representation of the score, or both. The user interface 240 may additionally or alternatively display a list of recently scored subject lines along with their corresponding scores.

The user interface architecture may include an iFramed react application. An authentication process may include authenticating a user that is logged in with a JWT. Launch integration points may include content builder (e.g., an Einstein Icon and iFramed view) and setup (e.g., to modify an existing view and gate by EID). The user interface architecture may support a REST API from the backend insights service (e.g., implementing JSON).

An example compute architecture may include a word embedding function that generates vectorized representations of words or phrases (e.g., Word2vec). In some examples, the NLP analysis server 205 may use such a word embedding function or may use any other NLP techniques. Machine learning models may be trained per activated EID. Scoring may be performed in near-real-time (NRT).

The system 200 may support a service including activation flow updates and service updates. The activation flow updates may include a new subject line tester activation property (e.g., a GET/activation-status). The activation flow updates may also include the ability to whitelist subject line tester EIDs. The insight service updates may include a new route to post to get score endpoint, a proxy request from user interface, or a combination thereof (e.g., a POST/insights/tester). In some cases, the insights service updates may include a subject line tester property to compute consumed routes (e.g., GET/organizations).

The service architecture may include a scoring post command to decode a JWT and pass the subject line 245 in the request body to be scored to the compute service API. The EID/MID context may be provided by the JWT, and authorization may be supported with an API key (e.g., a read-only API key). The service architecture may include an organizations update to inform the compute layer about activated subject line tester EIDs, include a feature property indicating active and/or participating users in a subject line tester pilot, limit training models to active subject line test users (e.g., whitelisted EIDs), or some combination thereof.

Figure 3:
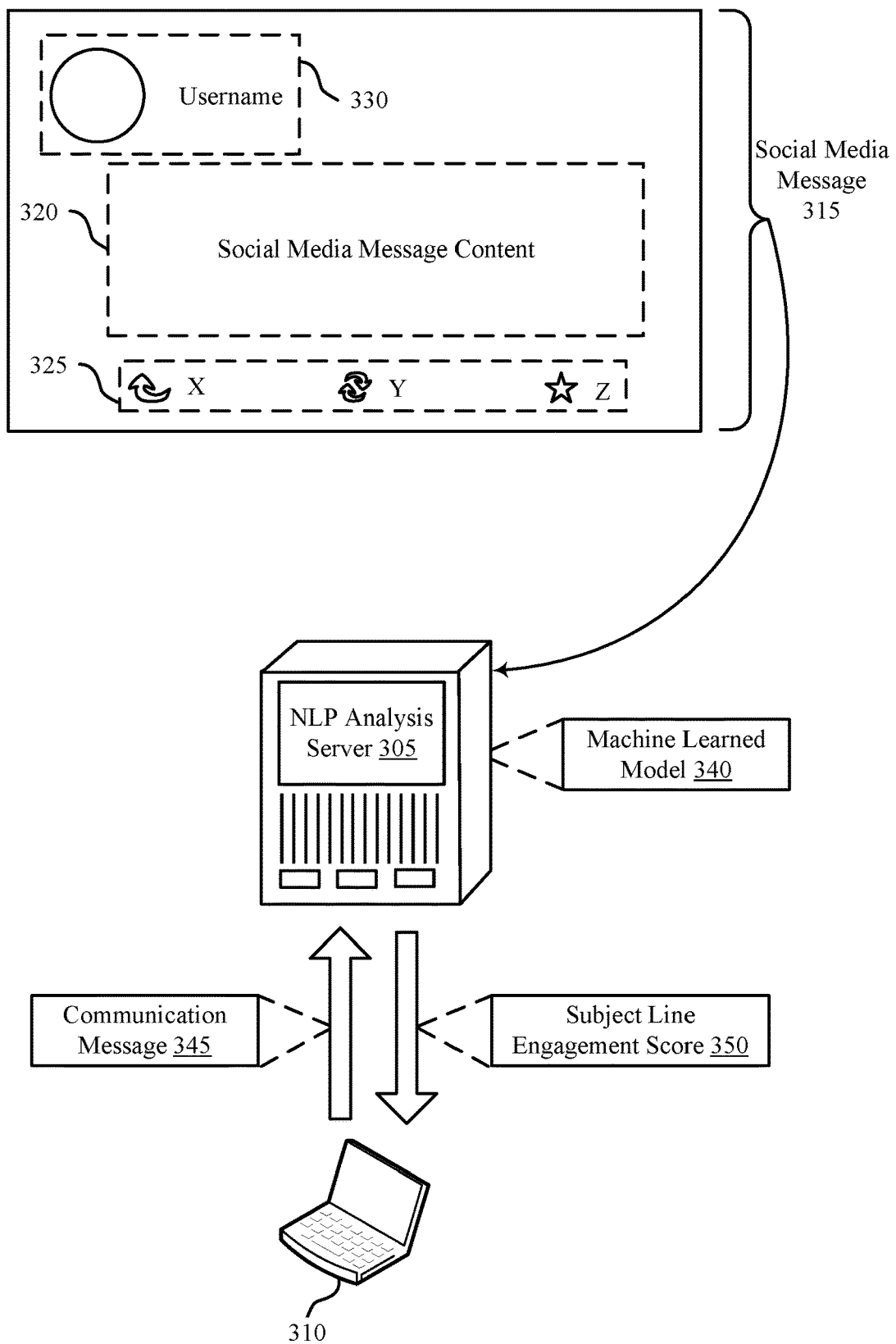

FIG. 3 illustrates an example of a system 300 that supports a subject line tester in accordance with aspects of the present disclosure. The system 300 may support an LI service. In some cases, the system 300 may be an example of a system 200 described with reference to FIG. 2. System 300 may include an NLP analysis server 305 in communication with a user device 310 and a message database storing one or more social media messages 315. The NLP analysis server 305 may be an example of a single server, a server cluster, a virtual machine, a cloud-based service, or any combination of these or other devices or systems supporting data processing.

Message training data based on the social media messages 315 may be sent from the message database to the NLP analysis server 305 to train a machine learned model 340. In some examples, the training data may include the social media messages 315, communication messages (e.g., emails, text messages, push notifications, etc.), or both. A social media message 315 may include social media message content 320 and interaction data 325. In some cases, the social media message 315 may be associated with a user account 330, which may include a username, an avatar, or both. In some cases, the interaction data may include a number of shares, a number of replies, a number of reactions (e.g., positive reactions, negative reactions, etc.), or any combination thereof. The system 300 may store information related to social media messages 315 for a specific set of users. In some cases, the system 300 may scrape—or otherwise retrieve—the social media information from a social media platform.

The NLP analysis server 305 may perform a machine learning process on the social media message content 320 and the interaction data 325 to generate the machine learned model 340. In some cases, the NLP analysis server 305 may determine a correlation between the social media message content 320 and the interaction data 325 based on an analysis of multiple social media messages 315. For example, the NLP analysis server 305 may identify contents which correlate to a relatively large number of interactions. If a social media message 315 with social media message content 320 has a large amount of interaction data 325 (e.g., a number of likes greater than a threshold number of likes, a number of shares greater than a threshold number of shares, a number of replies greater than a threshold number of replies, etc.), content which is similar to the social media message content 320 may be predicted to result in a relatively large amount of interaction data. If a social media message 315 has social media message content 320 and a relatively low amount of interaction (e.g., below one or more thresholds), then similar content may also be predicted to have relatively low interaction data. By training the machine learned model 340 on associations between the social media message content 320 and the interaction data 325, the machine learned model 340 may be able to predict interaction data for other social media messages based on the contents. For example, by performing an NLP analysis or some other form of analysis on the social media message content 320, the machine learning may train a model according to the relationships between the analyzed language and the corresponding interaction data 325.

In some cases, the machine learned model 340 may be trained on social media messages 315 from accounts 330 which meet a certain set of criteria. For example, the machine learned model 340 may be trained on social media messages 315 from accounts 330 with a specific number of affiliates, followers, posts, etc. In some examples, the machine learned model 340 may filter out one or more social media messages 315 based on a content filter. For example, social media messages 315 with images, or other contents which may not be included in a subject line, may not be used to train the machine learned model 340. In some cases, social media messages 315 may be filtered based on a profanity filter. In some cases, the machine learned model 340 may generate an engagement score for each social media message 315 used to train the machine learned model 340. The engagement score for a social media message 315 may be based on the interaction data 325 of the social media message 315. In some cases, the engagement score for a social media message 315 may be weighted based on the account 330 (e.g., a number of followers, affiliates, etc. of the account 330), a type of contents of the corresponding social media message content 320, or other factors. In some cases, the NLP analysis server 305 may filter social media messages 315 with a very high amount of interaction data 325 (e.g., above a static or dynamic maximum threshold) or social media messages 315 with a very low amount of interaction data 325 (e.g., below a static or dynamic maximum threshold).

In some examples, the NLP analysis server 305 may implement one or more mechanisms to account for using social media messages 315 to train a machine learning model for analyzing other types of messages (e.g., emails). For example, the NLP analysis server 305 may implement one or more weighting functions to weights specific words or phrases (e.g., words or phrases commonly used in emails in a specific industry) more than other words or phrases (e.g., words or phrases commonly used in social media messages but not commonly used in the specific industry, such as slang terms, inappropriate language, etc.). Additionally or alternatively, the NLP analysis server 305 may analyze words or phrases that result in high user interaction for social media but result in low user interaction or an undesirable user response for emails (e.g., controversial words or phrases counter to an organization's image) and may adjust the weighting for such words or phrases in the machine learned model 340 based on the analysis. In some cases, a user may specify a list of words or phrases to avoid, and the machine learned model 340 may be trained based on the list of words or phrases to avoid. Additionally or alternatively, the NLP analysis server 305 may identify words or phrases that correspond to unrelated fields (e.g., proper names of people, organizations, places, etc.) and may adjust the machine learned model 340 based on identifying these unrelated words or phrases.

The techniques described herein support using the machine learned model 340 to predict interaction data for communication messages 345 provided by a user device 310. For example, a communication message 345 may include a subject line. The communication message 345 may be, for example, an email or a push notification, or a similar type of marketing message. The NLP analysis server 305 may input the subject line of the communication message 345 into the machine learned model 340, and the machine learned model 340 may predict an engagement score 350 for the subject line. For example, if the subject line is similar to social media message content 320 with relatively high interaction data 325, then the engagement score 350 for the subject line may be relatively high. The engagement score 350 may indicate a likelihood of the communication message 345 being opened, interacted with, deleted, etc. based on the subject line. For example, if the engagement score 350 is high (e.g., above a specific threshold), then users receiving the communications message 345 may be predicted to open the communication message 345 based on the subject line (e.g., with an open rate higher than for a communication message 345 with a lower engagement score 350). If the engagement score 350 is low (e.g., below a specific threshold), then users receiving the communication message 345 may be predicted not to open the communication message 345 based on the subject line (e.g., with an open rate lower than for a communication message 345 with a higher engagement score 350). A user operating the user device 310 may view an engagement score 350 for a subject line and may revise the subject line to increase the engagement score 350.

In some cases, the machine learned model 340 may generate the engagement score 350 based on a range of values. For example, the machine learned model 340 may identify a first social media message 315 with a highest engagement score and a second social media message 315 with a lowest engagement score in the model training data. The highest engagement score may be based on the social media message 315 in the training set with the greatest amount of interaction data 325. The lowest engagement score may be based on the social media message 315 in the training set with the least amount of interaction data 325. In some cases, the machine learned model 340 may score a String of text (e.g., social media message content 320, a subject line, etc.) on a normalized scoring system according to the greatest amount of interaction data 325 and the least amount of interaction data 325. When a user device 310 submits a subject line or communication message 345 to be analyzed by the machine learned model 340, the subject line engagement score 350 may be within the range from the lowest engagement score to the highest engagement score. For example, if the analysis of the subject line predicts that the communication message 345 will be successful and commonly opened, the subject line engagement score 350 may be closer to the highest engagement score of the first social media message 315. In some examples, the engagement scores may be normalized on a scale from "1" to "100."

A user interface at user device 310 may present the analyzed subject line, received engagement score information, a message body corresponding to an email or similar communication message, or any combination thereof. The user interface may support presenting a list of recently scored subject lines. In some cases, the user interface may present the information visually (e.g., in a display), audibly, tactilely, or any combination thereof.

In some examples, the user device 310 may receive, as additional output from the machine learned model 340, a suggested change to the subject line. For example, the suggested change may be to change a word or phrase, add a word or phrase, remove a word or phrase, add icons or other content, or any combination thereof. In some cases, the suggested change to the subject line may be based on social media message content 320 which corresponds to relatively high interaction data 325. In some examples, the user may input an indication of selecting the suggested change to the subject line and the user device 310 may automatically transmit the communication message including an updated subject line based on the subject line and the suggested change to the subject line. In some cases, the display at the user interface may indicate how a word, or combination of words, affects the engagement score. For example, the machine learned model 340 may identify a word which negatively affects the subject line engagement score 350, where the machine learned model 340 determines that the recipient is less likely to open the communication message 345 based on the subject line including that word. The user interface may display that the word negatively affects the engagement score 350 and may suggest a replacement word which may increase the engagement score 350.

In some cases, the communication message may be transmitted to a user (e.g., a target customer), and the system 300 may receive feedback information indicating whether the communication message is opened by the user. For example, the system 300 may interact with one or more external systems automatically tracking message interaction information (e.g., recording if an email is opened, if an email is forwarded, if an email is sent to a spam folder, etc.). Additionally or alternatively, the communication message may include a survey or some other mechanism for a user to provide feedback. The NLP analysis server 305 may update the machine learned model 340 based on the received feedback information.

Figure 4:
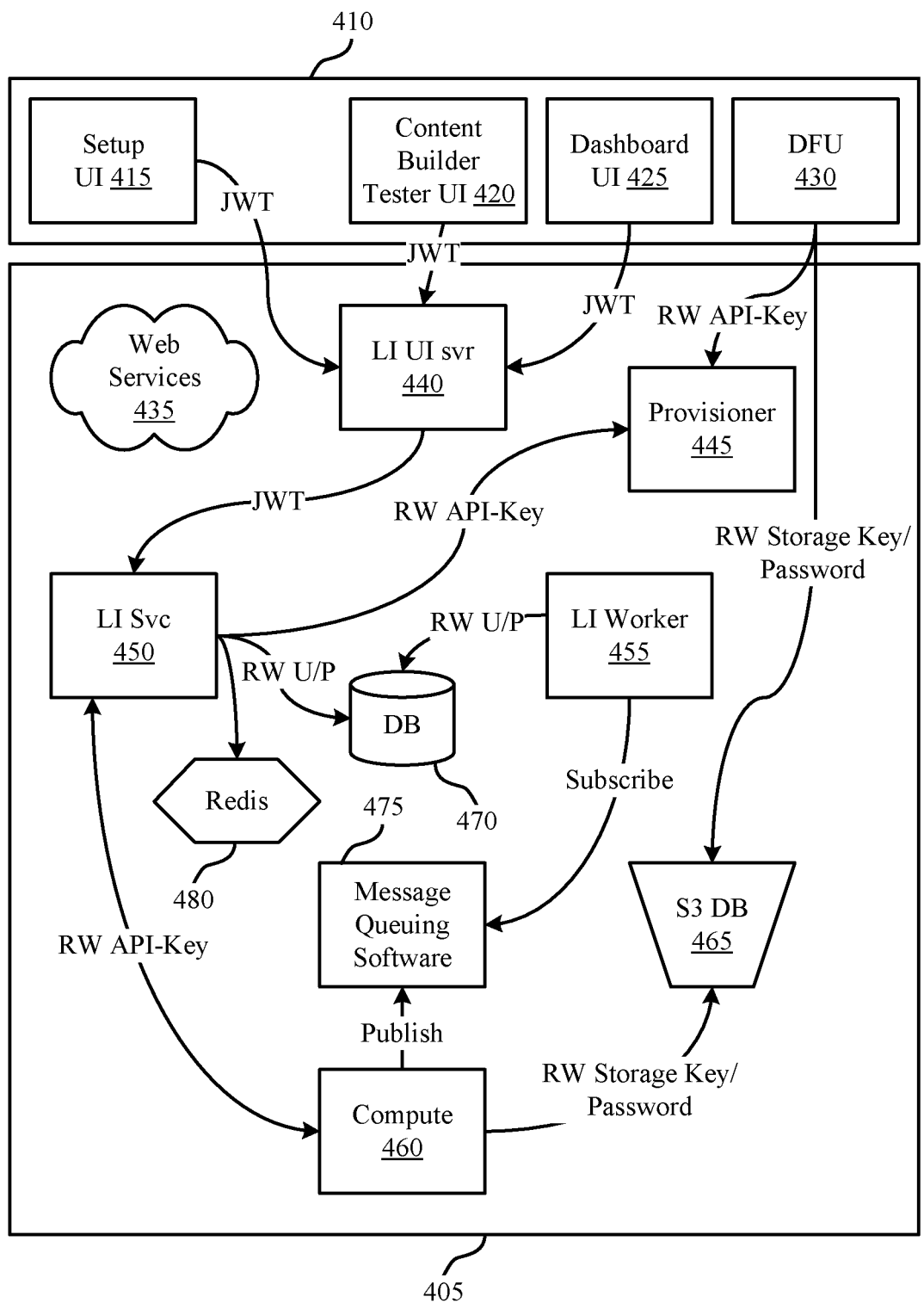
FIGS. 4 through 6 illustrate examples of system architectures that support a subject line tester in accordance with aspects of the present disclosure.

FIG. 4 illustrates an example of a system architecture 400 that supports a subject line tester in accordance with aspects of the present disclosure. The system architecture 400 may support an LI service. The LI service may perform NLP and machine learning techniques to gain insights from communication messages containing natural language information. For example, the LI service may analyze messages (e.g., email messages, social media messages, etc.) and historical information related to the messages (e.g., engagement information, such as opens, blocks, deletes, replies, likes, shares, comments, etc.) to determine one or more machine learning models that can analyze messages and predict message results (e.g., predict how a user will engage with an email).

The system architecture 400 may include a provider of analytics software and services (e.g., Marketing Cloud). This provider may be supported by a platform including a database, a client-side user interface 410, a server-side application, or any combination of these. For example, the platform may include a setup user interface iFrame 415, a content builder tester user interface iFrame 420, a dashboard user interface iFrame 425, a DFU 430, or some combination thereof. In some cases, one or more of these features may be user-facing (e.g., displayed at a client-side user interface 410 at a user device).

The system architecture 400 may additionally include a platform 405 providing processing resources for hosting data, performing analytics, and storing analytical results. The platform 405 may include any number of devices or systems for data processing, such as application servers, cloud-based servers, database servers, server clusters, virtual machines, containers, or the like. In some cases, the platform may be an example of a cloud-computing platform (e.g., Amazon Web Services (AWS) or other web services 435) that provides cloud-based resources for performing language insights.

The system architecture 400 may authenticate users using JWT authentication. For example, users interacting with the system via one or more of the user interfaces may utilize backend resources via an LI user interface server 440, where the users are authenticated based on one or more JWTs. The LI user interface server 440 may interact with an LI service 450, which may support a provisioner 445, a Redis 480, a database 470 (e.g., a Postgres database), and a compute system 460 and/or architecture. For example, the LI service 450 may transmit and/or receive a read/write (RW) API-Key to and/or from a compute system 460. One or more LI workers 455 may perform processing. For example, the compute system 460 may publish messages to a message queuing solution 475 (e.g., RabbitMQ) and an LI worker 455 may subscribe to the message queuing solution 475 to access a set of messages (e.g., specific to a set of users or a tenant). Additionally, the platform 405 may include a database (e.g., an S3 database 465), where the data in the database may be stored or retrieved according to an RW storage key, a password, or both. The systems and services may interact to store communication messages, analyze communication messages (e.g., using NLP techniques, machine learning techniques, feedback techniques, or some combination thereof), and surface insights based on the communication message analytics to one or more users (e.g., authenticated users).

Figure 5:
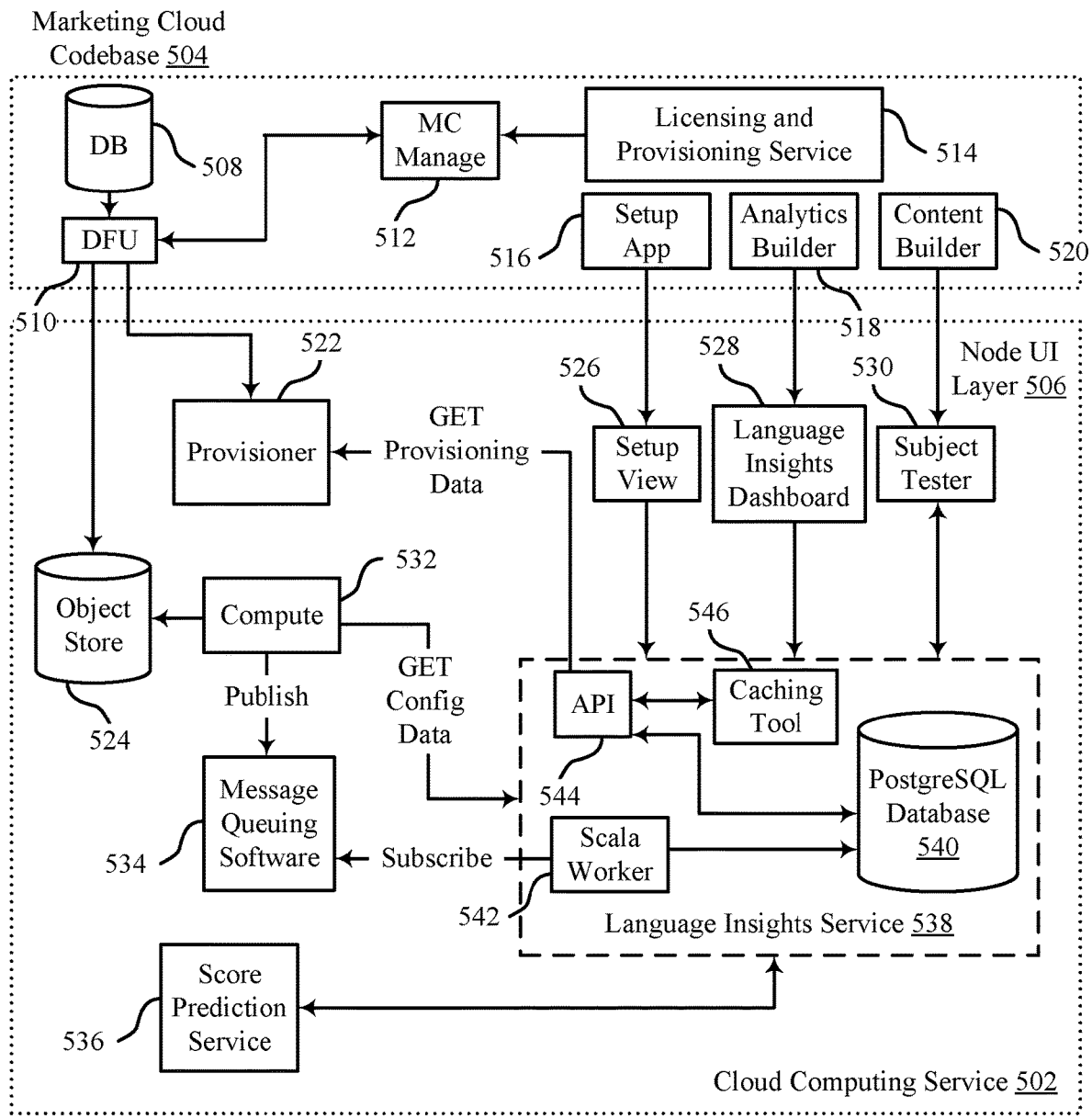

FIG. 5 illustrates an example of a system architecture 500 that supports a subject line tester in accordance with aspects of the present disclosure. The system architecture 500 may be an example or component of the system architecture 400. The system architecture 500 may support an LI service 538, including one or more APIs 544, workers (e.g., Scala workers 542), in-memory data structure stores (e.g., Redis), databases (e.g., a PostgreSQL database 540), or a combination thereof. In some cases, a cloud computing service 502 may implement the LI service 538 for one or more tenants in a multi-tenant environment. The LI service 538 may support an LI dashboard 528 for an analytics builder 518 (e.g., via a node user interface layer 506). Additionally, the LI service 538 may support a score prediction service 536 for scoring communication messages (e.g., emails, push notifications, etc.) based on a subject line of the communication messages, interaction data of social media messages, or both. In some cases, the score prediction service 536 may support scoring communication messages based on other aspects of the messages. The scores may relate to user engagement. For example, a communication message may receive a score based on a probability that a user (e.g., a generic user, a particular user, etc.) will open the communication message if the user receives the communication message in the user's inbox.

The system architecture 500 may further include a content builder 520 (e.g., a marketing cloud content builder for a marketing cloud codebase 504, such as a marketing cloud monolith). The content builder 520 may allow a user to build communication messages within a cloud-based service. The content builder 520 may interact with a subject line tester 530, which may surface insights based on a current subject line of a communication message in the content builder 520. For example, the content builder 520 may query the subject line tester 530 to receive an engagement score (or another score) for a subject line of an email. In some cases, this content builder 520 may automatically query the subject line tester 530 (e.g., in real-time or pseudo-real-time as a user drafts the subject line). In some other cases, a user may select to query the subject line tester 530 for an engagement score. The subject line tester 530 may include a machine learned model, where the machine learned model is generated based on the language insights service 538, the score prediction service 536, or both. The content builder 520 and subject line tester 530 may interact via a node user interface layer 506.

The cloud computing service 502, marketing cloud codebase 504, or both may store information in one or more databases. For example, the cloud computing service 502 may include an object store 524. A compute system 532 may interact with the object store 524 and a message queuing software 534. For example, the compute system 532 may get configuration data from the LI service 538, retrieve messages from the object store 524 based on the configuration data, and publish the messages to the message queuing software 534. A worker at the LI service 538 may subscribe to the message queuing software 534 to retrieve messages according to an order of the queue. In some cases, these messages may be used for the score prediction service 536, for example, to train a machine learned model. In some examples, the object store 524 may receive the messages from a database 508 at the marketing cloud codebase 504, for example, via a DFU 510. The DFU 510 may be managed by a marketing cloud management service 512, a licensing and provisioning service 514, or a combination thereof.

In some cases, the DFU 510 may additionally send information to a provisioner 522. The LI service 538 may get provisioning data from the provisioner 522 via an API 544. The API 544 may interact with a database (e.g., a PostrgeSQL database 540), a caching tool 546 in memory, or both for the LI service 538. The LI service 538 may additionally or alternatively be set up according to a setup application 516. The setup application 516 may support a setup view 526 (e.g., using a node user interface layer 506).

Figure 6:
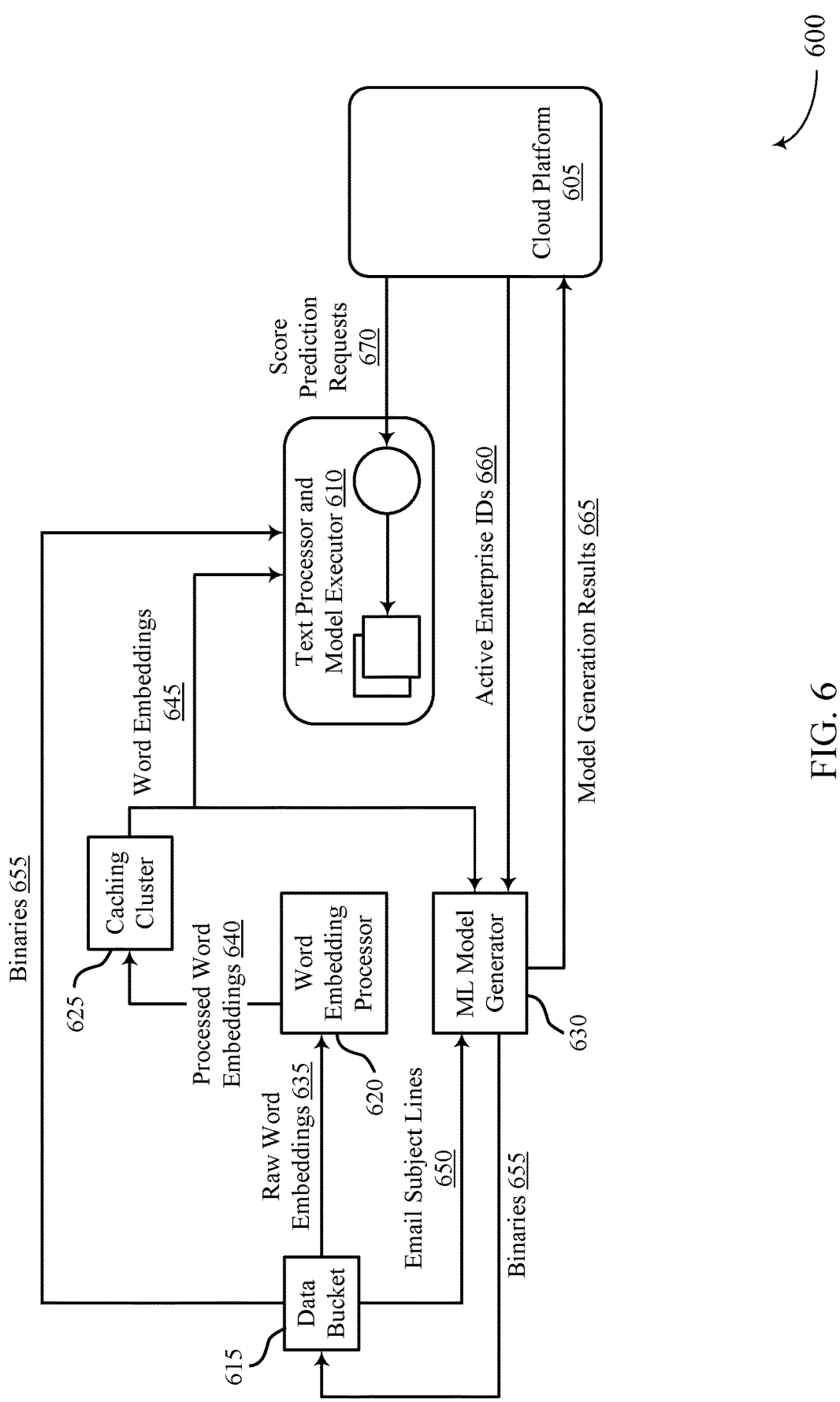

FIG. 6 illustrates an example of a system architecture 600 that supports a subject line tester in accordance with aspects of the present disclosure. The system architecture 600 may be an example or component of a system architecture 400 or 500 as described with reference to FIGS. 4 and 5. The system architecture 600 may be an example of a compute architecture. The system architecture 600 may run on a processing platform, such as a cloud platform 605 (e.g., AWS, Marketing Cloud Prime, etc.). The system architecture 600 may support machine learning model generation for communication message analysis, for example, at a machine learning model generator 630. The machine learning may be performed separately for different tenants of a multi-tenant system, for example, according to an active enterprise identifier 660 corresponding to a specific tenant. In some examples, the system architecture 600 may retrieve a set of communication messages and information related to the messages (e.g., user engagement information) from data storage (e.g., an S3 bucket or some other data bucket 615). In some cases, rather than retrieving the full messages, the system may retrieve portions of the messages (e.g., subject lines 650 for emails or push notifications) for analysis. The system architecture 600 may generate one or more machine learning models based on the messages. In some cases, this learning may be performed on batches of messages. Additionally or alternatively, in some cases, the learning may include continuous learning (e.g., based on a stream of information as messages are sent and received by users), trained learning, untrained learning, or any combination thereof.

In some cases, the machine learning model generator 630 may additionally receive word embeddings 645 (e.g., based on communication messages, such as the subject lines 650 of the communication messages). A word embedding processor 620 may perform word embedding (e.g., implementing word-to-vector embedding to map a subject line into a vector space) on raw word embeddings 635 and may cache the processed word embeddings 640 in a caching cluster 625. The machine learning model generator 630 may pass one or more model generation results 665 to a service for implementation (e.g., a cloud platform 605, such as Marketing Cloud Prime). These results may include machine learned models for analyzing communication messages. At implementation, the system architecture 600 may receive score prediction requests 670 (e.g., for communication messages, subject lines, etc.) and may use the model generation results 665 (e.g., a generated machine-learned model), the word embeddings 645, a text processor and a model executor 610, one or more machine learning binaries 655 (e.g., MLeap Binaries), or any combination thereof to analyze a text input (e.g., a subject line of a communication message) and output a resulting score. This score may be output to a user, used for further analysis at a server, used for further training of the machine learning models, or any combination thereof.

Figure 7:
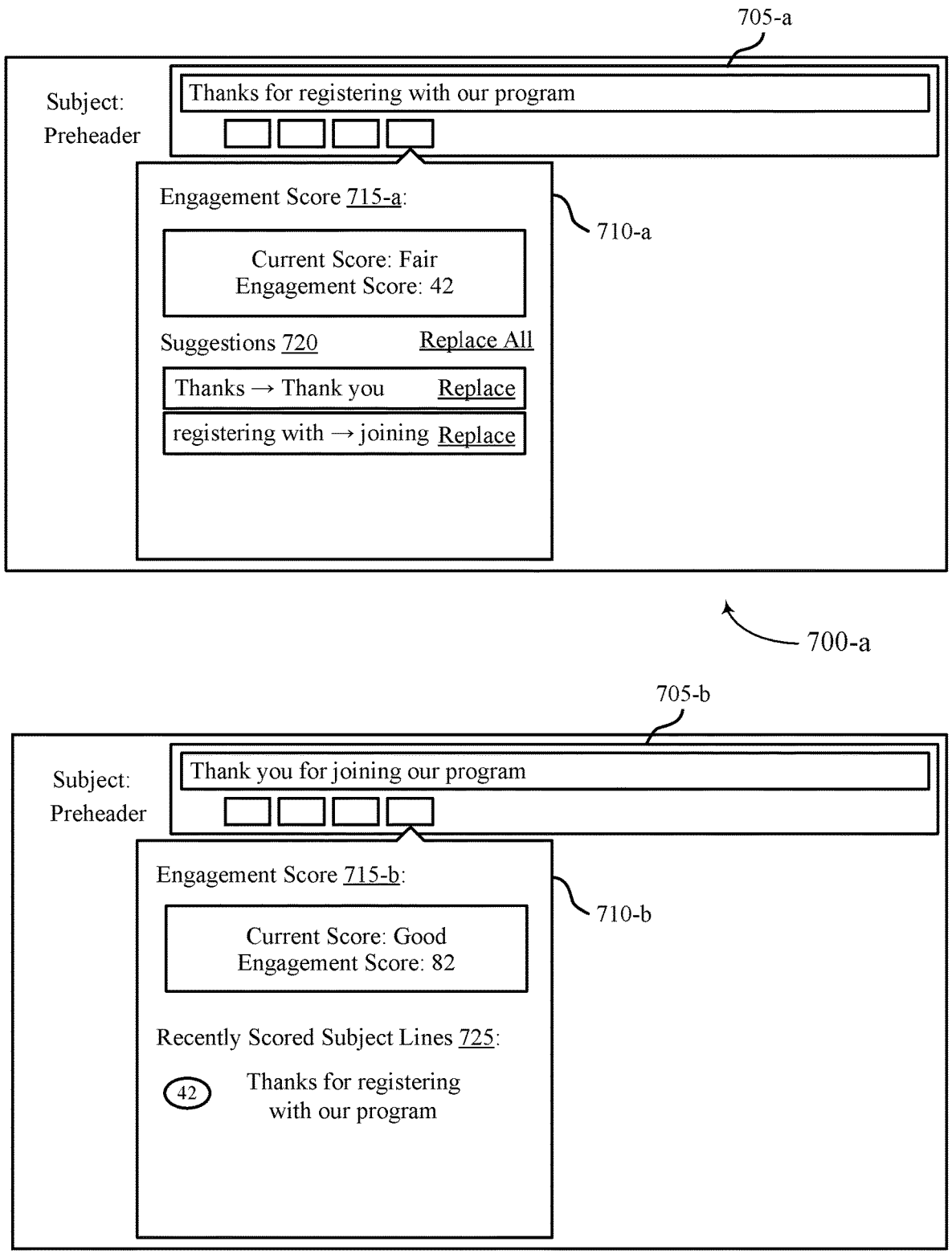
FIGS. 7 and 8 illustrate examples of user interfaces that support a subject line tester in accordance with aspects of the present disclosure.

FIG. 7 illustrates examples of user interfaces 700 that support a subject line tester in accordance with aspects of the present disclosure. User interfaces 700 illustrate examples of a system (e.g., the system 200 or 300 described with reference to FIGS. 2 and 3) displaying, at a user device, a score associated with a tested subject line. A user interface 700 may include an input field 705, an analysis display 710, and an engagement score 715 for a test String input into the input field 705. In some examples, the analysis display 710 may additionally present one or more suggestions 720, one or more recently scored subject lines 725, or a combination thereof. For example, the system may input the text String received in the input field 705—or an embedding or other transformed value indicating the text String—into a machine learned model (e.g., a model trained on social media messages, emails, push notifications, text messages, or a combination thereof). The model may output an engagement score 715 (e.g., normalized between a minimum value and a maximum value, such as 0 and 100), suggestions 720 to modify the text String in order to improve the engagement score 715, segmented scores indicating how different portions of the text String (e.g., specific words, specific phrases, specific punctuation, specific symbols, etc.) affect the engagement score 715, or any combination thereof. In some examples, the text String may be input into a set of models to receive a set of analysis information to display in the analysis display 710.

As illustrated for user interface 700-*a*, the text String "Thanks for registering with our program" (e.g., the subject line for an email in the input field 705-*a*) may correspond to an engagement score 715-*a* of 42 and may be assigned a rating of fair. Such analysis information may be presented in an analysis display 710-*a*. The rating may correspond to a specific range of engagement scores 715. In some examples, the system may provide suggestions 720 to enhance the score of the subject line. For example, a first suggestion 720 may be to change "Thanks" to "Thank you," and a second suggestion 720 may be to change "registering with" to "joining." If a user selects one or more of these suggestions 720 (e.g., by selecting the "replace" button or the "replace all" button), or otherwise indicates acceptance of a suggested change, the system may re-run the prediction analysis on the revised subject line and display the results. In some examples, the system may run the prediction analysis for one or more potential revised subject lines on the backend and cache the results, such that the system may refrain from re-running the prediction analysis when a suggested change is selected (e.g., to reduce latency). As illustrated for user interface 700-*b*, the revised subject line (e.g., updated in the input field 705-*b*) may receive an engagement score 715-*b* of 82 and an assigned rating of good (e.g., displayed in an analysis display 710-*b*). In some cases, if the system has no further suggestions 720 to improve the engagement score 715 for the text String, the system may display one or more recently scored subject lines 725 (e.g., including the text String and the engagement score). In some other cases, the system may display recently scored subject lines 725 in addition to the suggestions 720.

Figure 8:
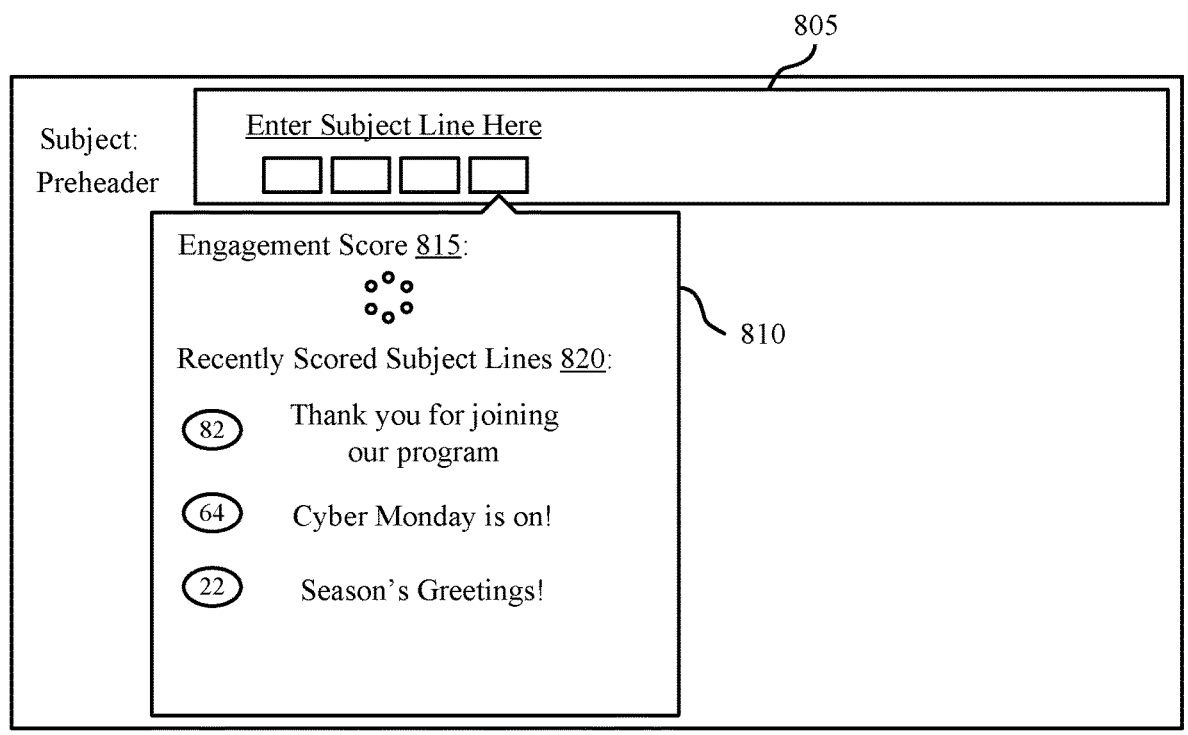

FIG. 8 illustrates an example of a user interface 800 that supports a subject line tester in accordance with aspects of the present disclosure. User interface 800 illustrates an example of the system (e.g., the system 200 or 300 described with reference to FIGS. 2 and 3) displaying a list of recently scored subject lines 820 and their associated scores. The system may store (e.g., in memory, at a user device, at a memory cache, etc.) recently tested subject lines and their scores for subsequent selection or editing. In some examples, the system may store up to a threshold number of recently scored subject lines 820. As subsequent subject lines are scored, the system may remove stored recently scored subject lines 820 on a least recently used (LRU) basis, remove stored recently scored subject lines 820 with the lowest engagement scores first, or remove stored recently scored subject lines 820 using any other technique or mechanism (e.g., specified by a user).

In some examples, the user interface 800 may include an input field 805, an analysis display 810, an engagement score 815 (e.g., for a text String entered in the input field 805), one or more recently scored subject lines 820, or a combination thereof. In some cases, a user may input a text String directly into the input field 805 for testing. In some other cases, the user may draft a communication message in the user interface 800, including a subject line in the input field 805. For example, the user may further draft an email body, select attachments for the email, select recipients for the email, or any combination thereof in the user interface 800. In yet some other cases, the user may send a communication message (e.g., an email, push notification, text message, social media post, etc.) for analysis to the system, and the system may automatically identify a "subject line" for analysis. The system may identify the "subject line" from the communication message and automatically propagate the "subject line" into the input field 805. The "subject line" may correspond to any test String from the communication message, such as text from a push notification, text from a text message, a subject line of an email, text from an email, text from a social media post (e.g., a first line of a social media post), text from an article (e.g., a title of an article), or any other text String from a communication message.

In some examples, selections in the user interface 800 may automatically update portions of a communication message. For example, the system may automatically update the subject line of an email based on changes made in the input field 805 or selected in the analysis display 810. When the user selects that the analysis is complete, in some cases, the system may automatically send the email with the updates. In some other cases, the system may output a draft email with the updates ready to send, and the user may select to send the updated email (e.g., in the subject line tester application or in another email application).

Figure 9:
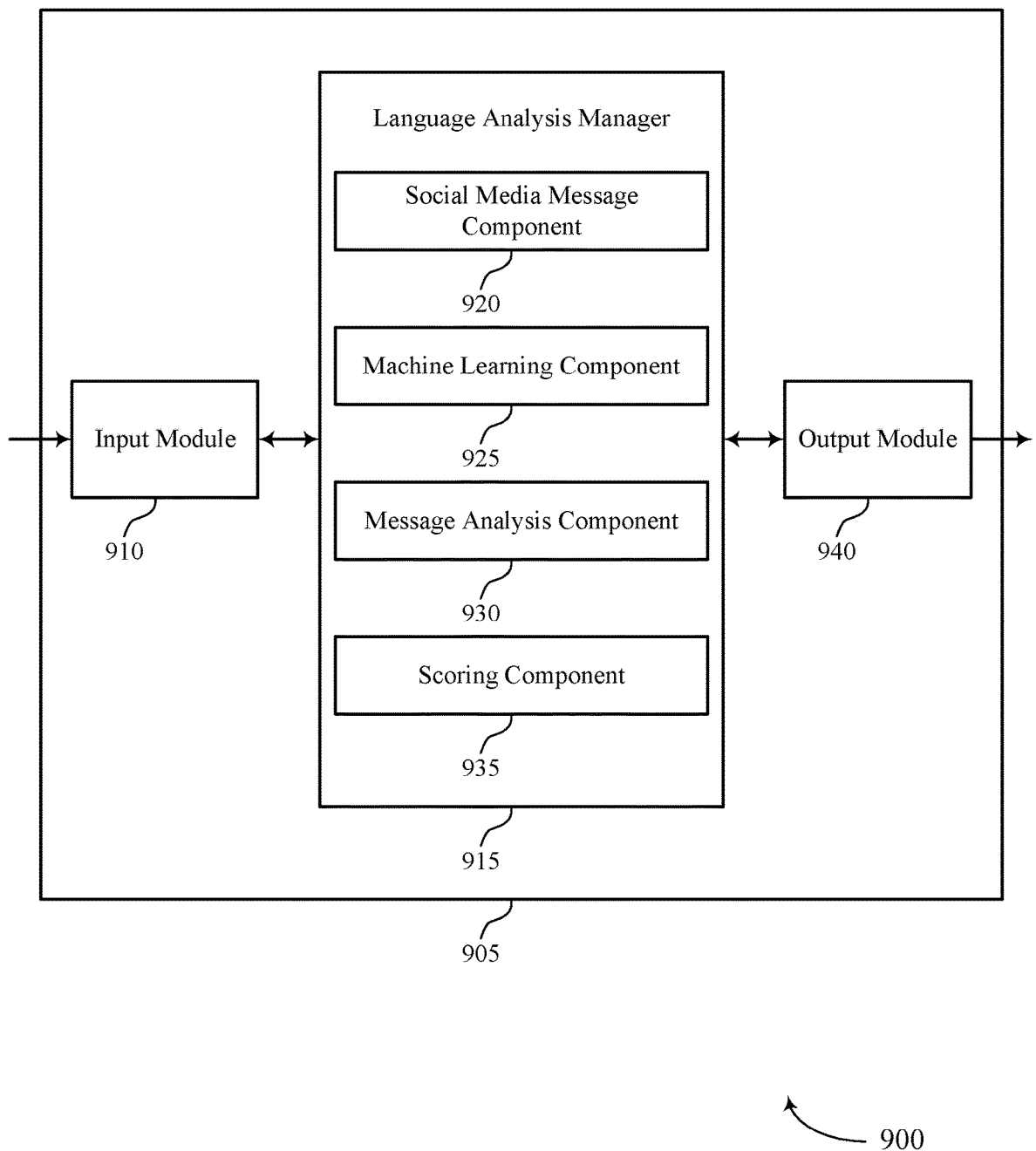
FIG. 9 shows a block diagram of an apparatus that supports a subject line tester in accordance with aspects of the present disclosure.

FIG. 9 shows a block diagram 900 of an apparatus 905 that supports a subject line tester in accordance with aspects of the present disclosure. The apparatus 905 may include an input module 910, a language analysis manager 915, and an output module 940. The apparatus 905 may also include a processor. Each of these components may be in communication with one another (e.g., via one or more buses). In some cases, the apparatus 905 may be an example of a user terminal, a database server, or a system containing multiple computing devices.

The input module 910 may manage input signals for the apparatus 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the apparatus 905 for processing. For example, the input module 910 may transmit input signals to the language analysis manager 915 to support a subject line tester. In some cases, the input module 910 may be a component of an input/output (I/O) controller 1115 as described with reference to FIG. 11.

The language analysis manager 915 may include a social media message component 920, a machine learning component 925, a message analysis component 930, and a scoring component 935. The language analysis manager 915 may be an example of aspects of the language analysis manager 1005 or 1110 described with reference to FIGS. 10 and 11. In some cases, the language analysis manager 915 may include a message reception component.

The language analysis manager 915 and/or at least some of its various sub-components may be implemented in hardware, software executed by a processor, firmware, or any combination thereof. If implemented in software executed by a processor, the functions of the language analysis manager 915 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The language analysis manager 915 and/or at least some of its various sub-components may be physically located at various positions, including being distributed such that portions of functions are implemented at different physical locations by one or more physical devices. In some examples, the language analysis manager 915 and/or at least some of its various sub-components may be a separate and distinct component in accordance with various aspects of the present disclosure. In other examples, the language analysis manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The social media message component 920 may receive a set of social media messages including a set of respective message contents. The machine learning component 925 may perform a machine learning process on the set of respective message contents and message interaction data corresponding to the set of social media messages to generate a machine learned model. The message analysis component 930 may receive a subject line for a communication message for analysis and input the subject line into the machine learned model. The scoring component 935 may receive, as an output of the machine learned model, an engagement score based on the subject line, where the engagement score indicates an estimated probability that a user receiving the communication message opens the communication message.

In some examples, the machine learning component 925 may receive a set of communication messages including a set of respective subject lines and perform a machine learning process on the set of respective subject lines and message open rate data corresponding to the set of communication messages to generate a machine learned model. In some cases, the message analysis component 930 may receive a subject line for a communication message for analysis. In some examples, the message analysis component 930 may input the subject line into the machine learned model. In some cases, the scoring component 935 may receive, as an output of the machine learned model, an engagement score based on the subject line, where the engagement score indicates an estimated probability that a user receiving the communication message opens the communication message.

The output module 940 may manage output signals for the apparatus 905. For example, the output module 940 may receive signals from other components of the apparatus 905, such as the language analysis manager 915, and may transmit these signals to other components or devices. In some specific examples, the output module 940 may transmit output signals for display in a user interface, for storage in a database or data store, for further processing at a server or server cluster, or for any other processes at any number of devices or systems. In some cases, the output module 940 may be a component of an I/O controller 1115 as described with reference to FIG. 11.

Figure 10:
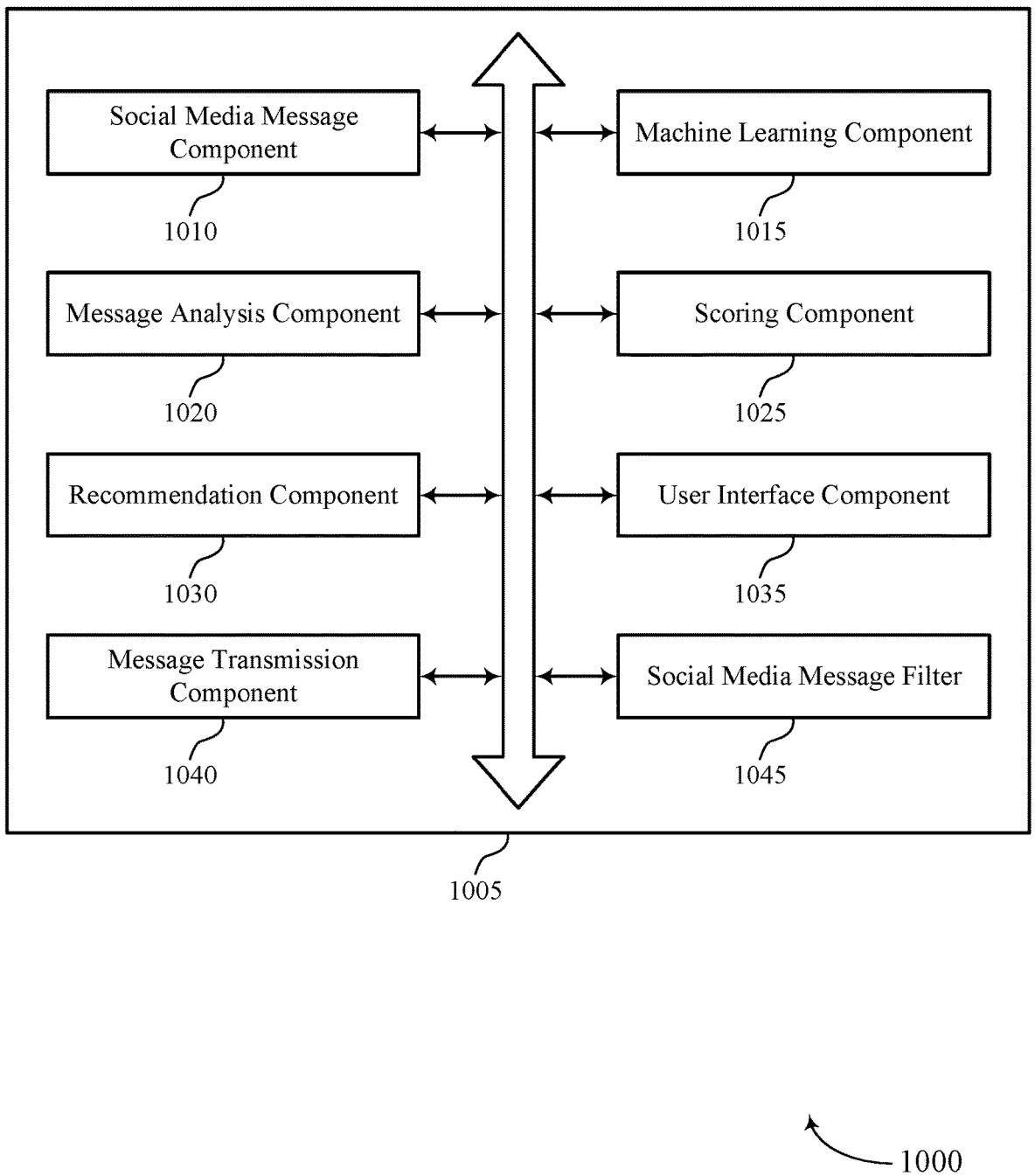
FIG. 10 shows a block diagram of a language analysis manager that supports a subject line tester in accordance with aspects of the present disclosure.

FIG. 10 shows a block diagram 1000 of a language analysis manager 1005 that supports a subject line tester in accordance with aspects of the present disclosure. The language analysis manager 1005 may be an example of aspects of a language analysis manager 915 or a language analysis manager 1110 described herein. The language analysis manager 1005 may include a social media message component 1010, a machine learning component 1015, a message analysis component 1020, a scoring component 1025, a recommendation component 1030, a user interface component 1035, a message transmission component 1040, and a social media message filter 1045. Each of these components may communicate, directly or indirectly, with one another (e.g., via one or more buses).

The social media message component 1010 may receive a set of social media messages including a set of respective message contents. The machine learning component 1015 may perform a machine learning process on the set of respective message contents and message interaction data corresponding to the set of social media messages to generate a machine learned model. In some examples, the machine learning component 1015 may determine an association between the set of respective message contents and the message interaction data corresponding to the set of social media messages, where the machine learned model is based on the association.

In some examples, the machine learning component 1015 may train the machine learned model using a first subset of the set of social media messages. In some such examples, the machine learning component 1015 may validate the machine learned model using a second subset of the set of social media messages. In some examples, the machine learning component 1015 may input respective message contents for each message of the second subset of social media messages into the machine learned model to obtain respective predicted message interaction data for each message of the second subset of social media messages. In some examples, the machine learning component 1015 may compare the respective predicted message interaction data for each message of the second subset of social media messages to respective actual message interaction data corresponding to each message of the second subset of social media messages. In some examples, the machine learning component 1015 may further train the machine learned model based on the comparing.

The message analysis component 1020 may receive a subject line for a communication message for analysis. In some examples, the message analysis component 1020 may input the subject line into the machine learned model.

The scoring component 1025 may receive, as an output of the machine learned model, an engagement score based on the subject line, where the engagement score indicates an estimated probability that a user receiving the communication message opens the communication message.

In some examples, the scoring component 1025 may receive, as an additional output of the machine learned model, an indicated segmentation of the subject line into a set of portions and a respective indication of how each portion of the set of portions affects the engagement score for the subject line.

The recommendation component 1030 may receive, as an additional output of the machine learned model, one or more suggested changes to the subject line. In some examples, the recommendation component 1030 may receive a user input indicating a suggested change of the one or more suggest changes to the subject line. In some such examples, the recommendation component 1030 may update the communication message to include an updated subject line based on the subject line and the suggested change. In some examples, the recommendation component 1030 may receive one or more additional engagement scores corresponding to the one or more suggested changes to the subject line. The user interface component 1035 may send, for display in a user interface of a user device, the engagement score, the one or more additional engagement scores corresponding to the one or more suggested changes to the subject line, or both.

The message transmission component 1040 may transmit the communication message to one or more users. In some examples, the message transmission component 1040 may receive, from at least one user of the one or more users, feedback information indicating user engagement with the communication message. In some examples, the message transmission component 1040 may update the machine learned model based on the feedback information.

In some examples, the message transmission component 1040 may determine an actual user engagement score based on the feedback information, where the machine learned model is updated based on a difference between the predicted user engagement score and the actual user engagement score. In some cases, the user engagement with the communication message includes opening the communication message, replying to the communication message, forwarding the communication message, performing an action associated with the communication message, or a combination thereof.

The social media message filter 1045 may filter a total set of social media messages to remove one or more outlier social media messages with message engagement data greater than a first threshold engagement amount or lower than a second threshold engagement amount, where the set of social media messages is received from the filtered total set of social media messages.

In some examples, the social media message filter 1045 may identify a criterion for an account based on a number of other accounts connected to the account, a number of social media messages associated with the account, content of social media messages associated with the account, or a combination thereof. In some such examples, the social media message filter 1045 may select a set of accounts based on the criterion, where the set of social media messages is received from the selected set of accounts.

In some examples, the social media message component 1010 may identify a first social media message of the set of social media messages with a highest message interaction rate and a second social media message of the set of social media messages with a lowest message interaction rate, where the first social media message and the second social media message correspond to a range for the engagement score.

In some cases, the set of social media messages is received based on a set of users generating the set of social media messages, a common subset of message contents of the set of social media messages, the message interaction data corresponding to the set of social media messages, or a combination thereof. In some cases, the message interaction data includes a number of shares, a number of responses, a number of views, or a combination thereof. In some cases, the respective message contents includes text, a link, an emoticon, an image, or a combination thereof. In some cases, the communication message includes an email message, a push notification, a text message, an advertisement, or a combination thereof. In some cases, the subject line includes text, a link, or a combination thereof.

In some cases, the machine learning component 1015 may receive a set of communication messages including a set of respective subject lines. In some cases, the machine learning component 1015 may perform a machine learning process on the set of respective subject lines and message open rate data corresponding to the set of communication messages to generate a machine learned model.

In some cases, a message reception component may receive a communication message for analysis, the communication message including a subject line. In some cases, the message analysis component 1020 may input the subject line into the machine learned model. In some cases, the scoring component 1025 may receive, as an output of the machine learned model, an engagement score based on the subject line, where the engagement score indicates an estimated probability that a user receiving the communication message opens the communication message.

The recommendation component 1030 may receive, as an additional output of the machine learned model, a suggested change to the subject line. In some examples, the recommendation component 1030 may receive a user input indicating the suggested change to the subject line and may automatically transmit the communication message including an updated subject line based on the subject line and the suggested change to the subject line.

In some examples, the user interface component 1035 may send, for display in a user interface, the engagement score. Additionally or alternatively, the user interface component 1035 may send, for display in a user interface, a list of recently scored subject lines.

The message transmission component 1040 may transmit the communication message to a user. In some examples, the machine learning component 1015 may receive feedback information indicating whether the communication message is opened by the user and may update the machine learned model based on the feedback information.

Figure 11:
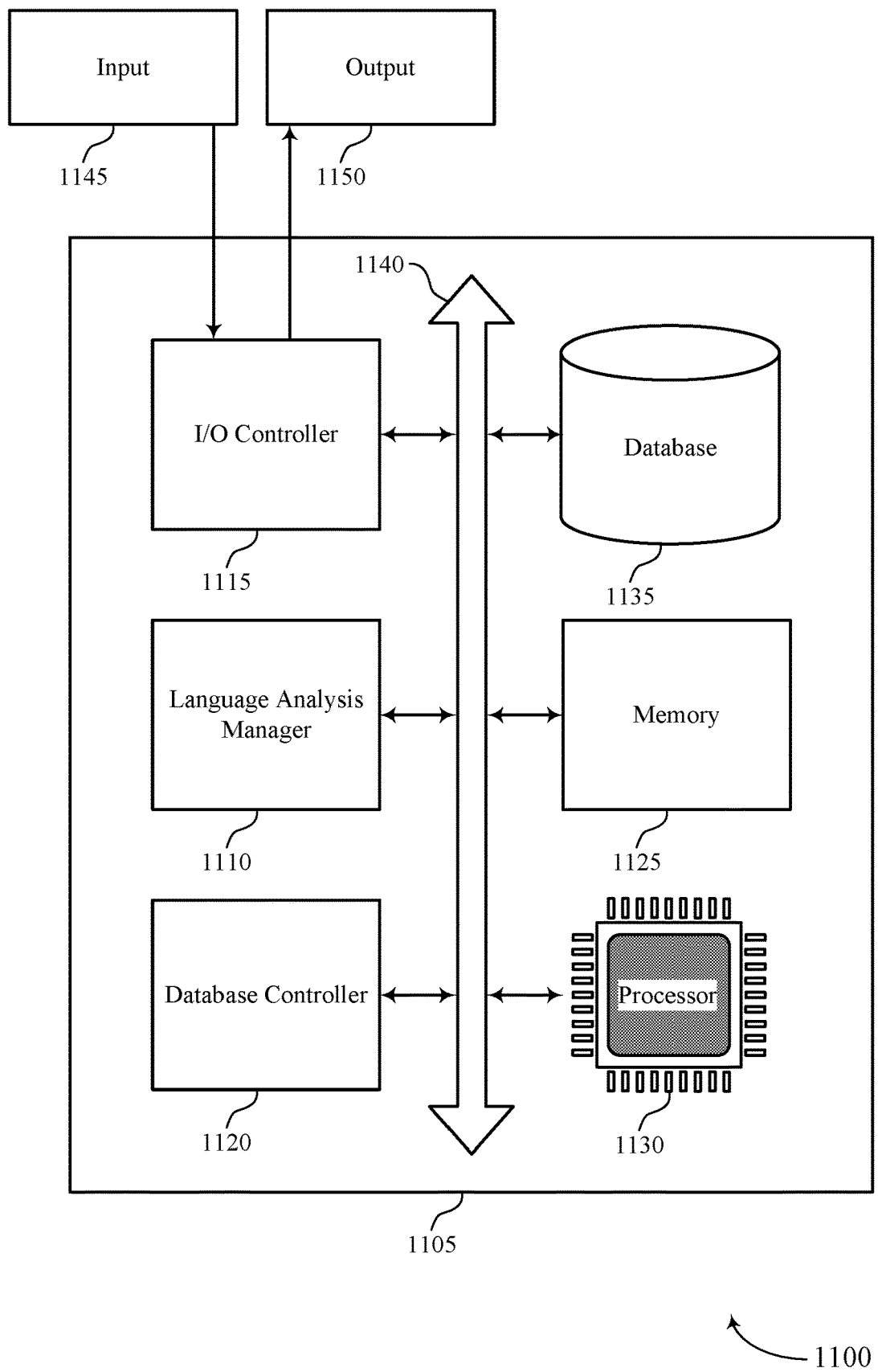
FIG. 11 shows a diagram of a system including a device that supports a subject line tester in accordance with aspects of the present disclosure.

FIG. 11 shows a diagram of a system 1100 including a device 1105 that supports a subject line tester in accordance with aspects of the present disclosure. The device 1105 may be an example of or include the components of an application server or an apparatus 905 as described herein. The device 1105 may include components for bi-directional data communications including components for transmitting and receiving communications, including a language analysis manager 1110, an I/O controller 1115, a database controller 1120, memory 1125, a processor 1130, and a database 1135. These components may be in electronic communication via one or more buses (e.g., bus 1140).

The language analysis manager 1110 may be an example of a language analysis manager 915 or 1005 as described herein. For example, the language analysis manager 1110 may perform any of the methods or processes described above with reference to FIGS. 9 and 10. In some cases, the language analysis manager 1110 may be implemented in hardware, software executed by a processor, firmware, or any combination thereof.

The I/O controller 1115 may manage input signals 1145 and output signals 1150 for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The database controller 1120 may manage data storage and processing in a database 1135. In some cases, a user may interact with the database controller 1120. In other cases, the database controller 1120 may operate automatically without user interaction. The database 1135 may be an example of a single database, a distributed database, multiple distributed databases, a data store, a data lake, or an emergency backup database.

Memory 1125 may include random-access memory (RAM) and read-only memory (ROM). The memory 1125 may store computer-readable, computer-executable software including instructions that, when executed, cause the processor to perform various functions described herein. In some cases, the memory 1125 may contain, among other things, a basic I/O system (BIOS) which may control basic hardware or software operation such as the interaction with peripheral components or devices.

The processor 1130 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting a subject line tester).

Figure 12:
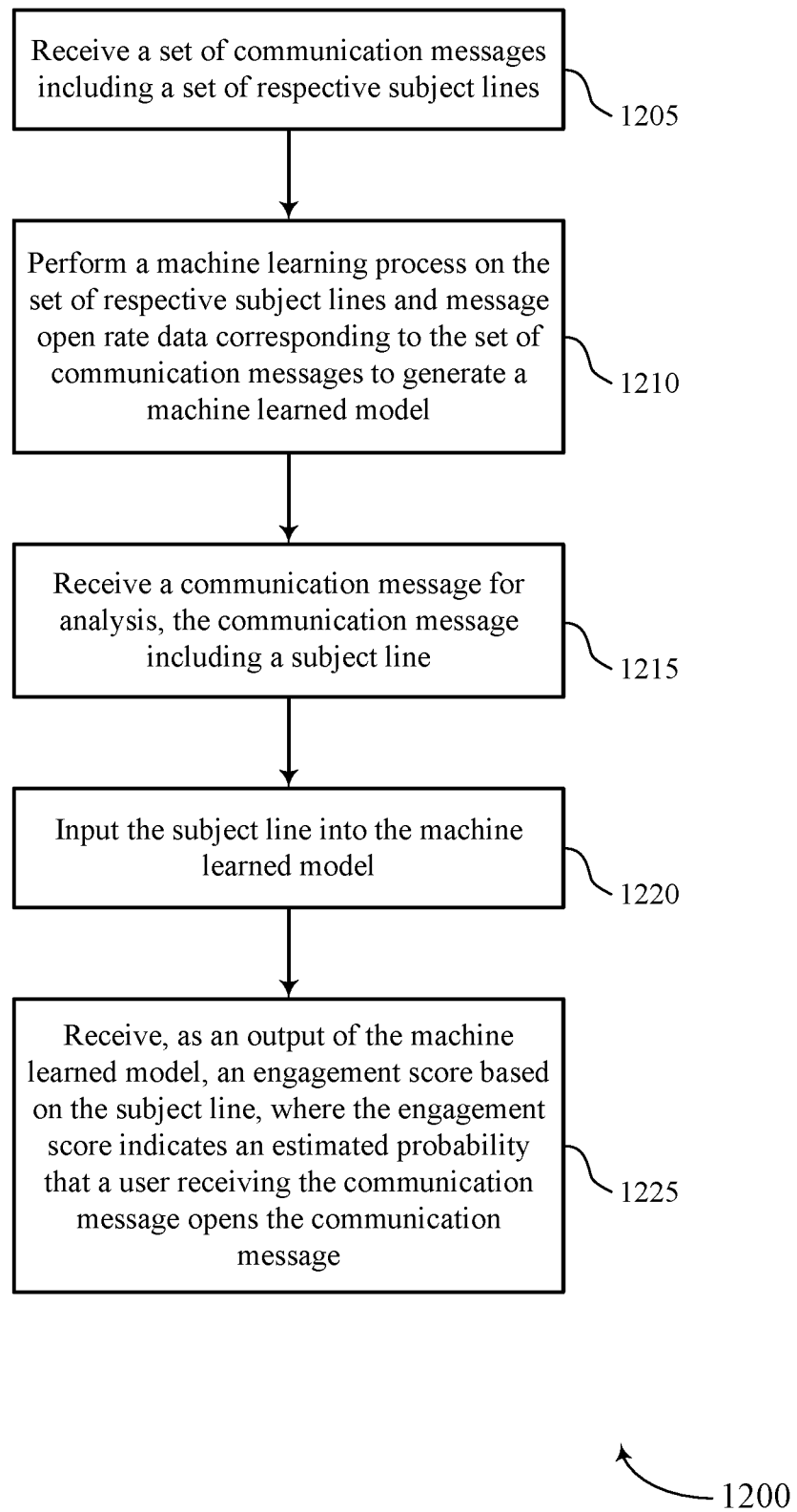
FIGS. 12 through 15 show flowcharts illustrating methods that support a subject line tester in accordance with aspects of the present disclosure.

FIG. 12 shows a flowchart illustrating a method 1200 that supports a subject line tester in accordance with aspects of the present disclosure. The operations of method 1200 may be implemented by an application server (e.g., a single server, a server cluster, a cloud-based service, a virtual machine, a user device, or any other system or device supporting data processing) or its components as described herein. For example, the operations of method 1200 may be performed by a language analysis manager as described with reference to FIGS. 9 through 11. In some examples, an application server may execute a set of instructions to control the functional elements of the application server to perform the functions described below. Additionally or alternatively, an application server may perform aspects of the functions described below using special-purpose hardware.

At 1205, the application server may receive a set of communication messages including a set of respective subject lines. The operations of 1205 may be performed according to the methods described herein. In some examples, aspects of the operations of 1205 may be performed by a machine learning component as described with reference to FIGS. 9 through 11.

At 1210, the application server may perform a machine learning process on the set of respective subject lines and message open rate data corresponding to the set of communication messages to generate a machine learned model. The operations of 1210 may be performed according to the methods described herein. In some examples, aspects of the operations of 1210 may be performed by a machine learning component as described with reference to FIGS. 9 through 11.

At 1215, the application server may receive a subject line for a communication message for analysis. The operations of 1215 may be performed according to the methods described herein. In some examples, aspects of the operations of 1215 may be performed by a message reception component or message analysis component as described with reference to FIGS. 9 through 11.

At 1220, the application server may input the subject line into the machine learned model. The operations of 1220 may be performed according to the methods described herein. In some examples, aspects of the operations of 1220 may be performed by a message analysis component as described with reference to FIGS. 9 through 11.

At 1225, the application server may receive, as an output of the machine learned model, an engagement score based on the subject line, where the engagement score indicates an estimated probability that a user receiving the communication message opens the communication message. The operations of 1225 may be performed according to the methods described herein. In some examples, aspects of the operations of 1225 may be performed by a scoring component as described with reference to FIGS. 9 through 11.

Figure 13:
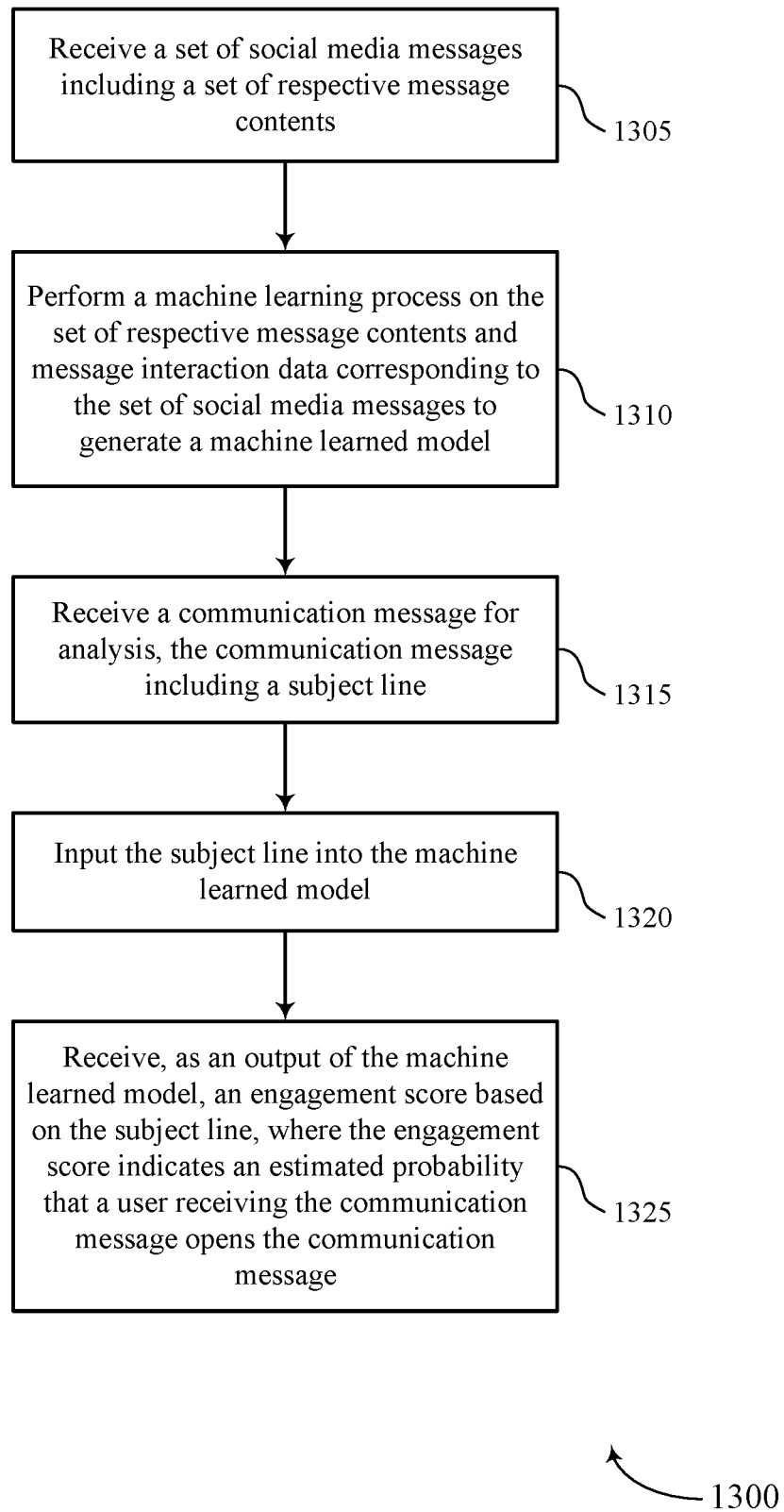

FIG. 13 shows a flowchart illustrating a method 1300 that supports a subject line tester in accordance with aspects of the present disclosure. The operations of method 1300 may be implemented by an application server (e.g., a single server, a server cluster, a cloud-based service, a virtual machine, a user device, or any other system or device supporting data processing) or its components as described herein. For example, the operations of method 1300 may be performed by a language analysis manager as described with reference to FIGS. 9 through 11. In some examples, an application server may execute a set of instructions to control the functional elements of the application server to perform the functions described below. Additionally or alternatively, an application server may perform aspects of the functions described below using special-purpose hardware.

At 1305, the application server may receive a set of social media messages including a set of respective message contents. The operations of 1305 may be performed according to the methods described herein. In some examples, aspects of the operations of 1305 may be performed by a social media message component as described with reference to FIGS. 9 through 11.

At 1310, the application server may perform a machine learning process on the set of respective message contents and message interaction data corresponding to the set of social media messages to generate a machine learned model. The operations of 1310 may be performed according to the methods described herein. In some examples, aspects of the operations of 1310 may be performed by a machine learning component as described with reference to FIGS. 9 through 11.

At 1315, the application server may receive a subject line for a communication message for analysis. The operations of 1315 may be performed according to the methods described herein. In some examples, aspects of the operations of 1315 may be performed by a message analysis component as described with reference to FIGS. 9 through 11.

At 1320, the application server may input the subject line into the machine learned model. The operations of 1320 may be performed according to the methods described herein. In some examples, aspects of the operations of 1320 may be performed by a message analysis component as described with reference to FIGS. 9 through 11.

At 1325, the application server may receive, as an output of the machine learned model, an engagement score based on the subject line, where the engagement score indicates an estimated probability that a user receiving the communication message opens the communication message. The operations of 1325 may be performed according to the methods described herein. In some examples, aspects of the operations of 1325 may be performed by a scoring component as described with reference to FIGS. 9 through 11.

Figure 14:
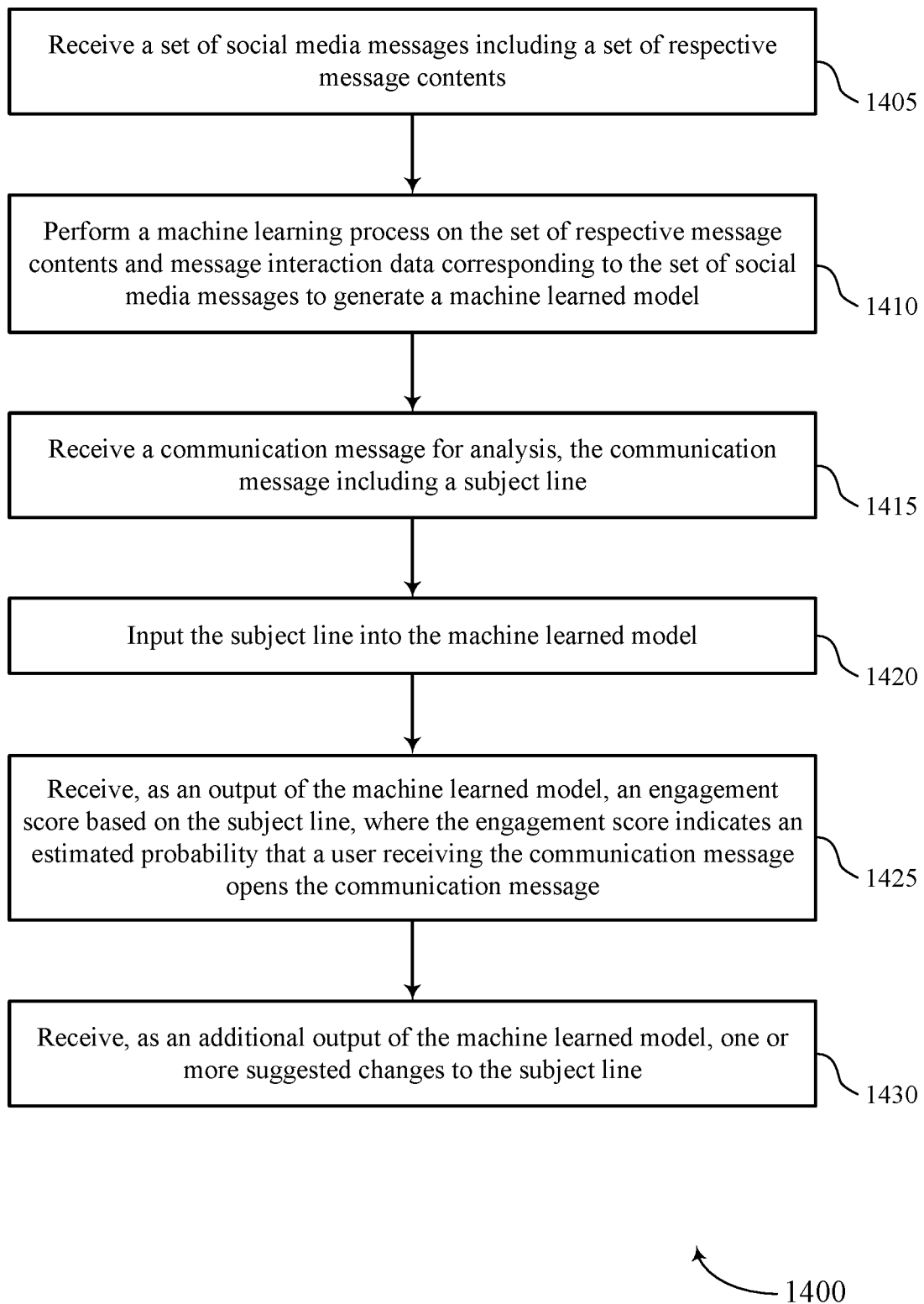

FIG. 14 shows a flowchart illustrating a method 1400 that supports a subject line tester in accordance with aspects of the present disclosure. The operations of method 1400 may be implemented by an application server (e.g., a single server, a server cluster, a cloud-based service, a virtual machine, a user device, or any other system or device supporting data processing) or its components as described herein. For example, the operations of method 1400 may be performed by a language analysis manager as described with reference to FIGS. 9 through 11. In some examples, an application server may execute a set of instructions to control the functional elements of the application server to perform the functions described below. Additionally or alternatively, an application server may perform aspects of the functions described below using special-purpose hardware.

At 1405, the application server may receive a set of social media messages including a set of respective message contents. The operations of 1405 may be performed according to the methods described herein. In some examples, aspects of the operations of 1405 may be performed by a social media message component as described with reference to FIGS. 9 through 11.

At 1410, the application server may perform a machine learning process on the set of respective message contents and message interaction data corresponding to the set of social media messages to generate a machine learned model. The operations of 1410 may be performed according to the methods described herein. In some examples, aspects of the operations of 1410 may be performed by a machine learning component as described with reference to FIGS. 9 through 11.

At 1415, the application server may receive a subject line for a communication message for analysis. The operations of 1415 may be performed according to the methods described herein. In some examples, aspects of the operations of 1415 may be performed by a message analysis component as described with reference to FIGS. 9 through 11.

At 1420, the application server may input the subject line into the machine learned model. The operations of 1420 may be performed according to the methods described herein. In some examples, aspects of the operations of 1420 may be performed by a message analysis component as described with reference to FIGS. 9 through 11.

At 1425, the application server may receive, as an output of the machine learned model, an engagement score based on the subject line, where the engagement score indicates an estimated probability that a user receiving the communication message opens the communication message. The operations of 1425 may be performed according to the methods described herein. In some examples, aspects of the operations of 1425 may be performed by a scoring component as described with reference to FIGS. 9 through 11.

At 1430, the application server may additionally receive, as an additional output of the machine learned model, one or more suggested changes to the subject line. The operations of 1430 may be performed according to the methods described herein. In some examples, aspects of the operations of 1430 may be performed by a recommendation component as described with reference to FIGS. 9 through 11.

Figure 15:
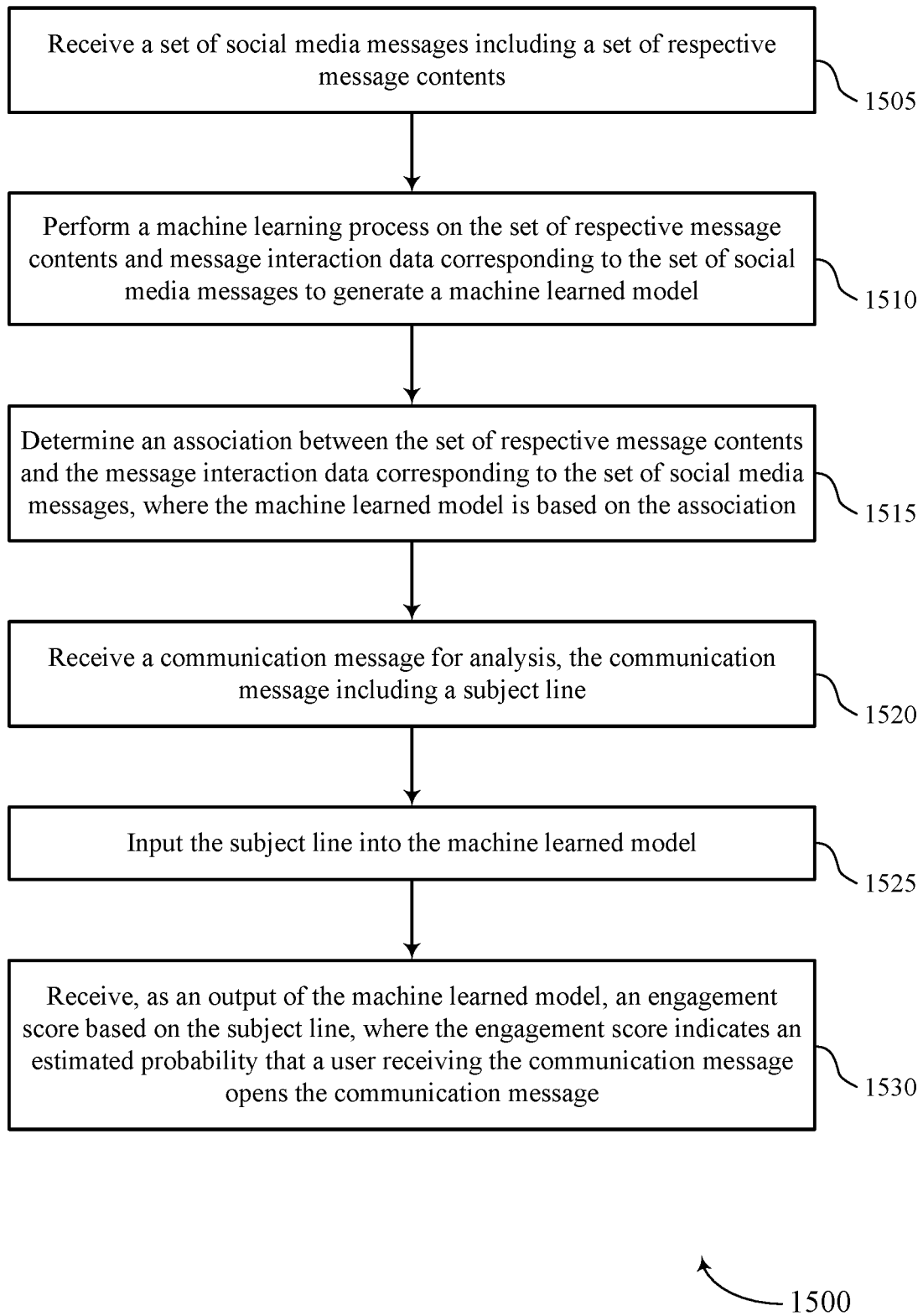

FIG. 15 shows a flowchart illustrating a method 1500 that supports a subject line tester in accordance with aspects of the present disclosure. The operations of method 1500 may be implemented by an application server (e.g., a single server, a server cluster, a cloud-based service, a virtual machine, a user device, or any other system or device supporting data processing) or its components as described herein. For example, the operations of method 1500 may be performed by a language analysis manager as described with reference to FIGS. 9 through 11. In some examples, an application server may execute a set of instructions to control the functional elements of the application server to perform the functions described below. Additionally or alternatively, an application server may perform aspects of the functions described below using special-purpose hardware.

At 1505, the application server may receive a set of social media messages including a set of respective message contents. The operations of 1505 may be performed according to the methods described herein. In some examples, aspects of the operations of 1505 may be performed by a social media message component as described with reference to FIGS. 9 through 11.

At 1510, the application server may perform a machine learning process on the set of respective message contents and message interaction data corresponding to the set of social media messages to generate a machine learned model. The operations of 1510 may be performed according to the methods described herein. In some examples, aspects of the operations of 1510 may be performed by a machine learning component as described with reference to FIGS. 9 through 11.

At 1515, the application server may determine an association between the set of respective message contents and the message interaction data corresponding to the set of social media messages, where the machine learned model is based on the association. The operations of 1515 may be performed according to the methods described herein. In some examples, aspects of the operations of 1515 may be performed by a machine learning component as described with reference to FIGS. 9 through 11.

At 1520, the application server may receive a subject line for a communication message. The operations of 1520 may be performed according to the methods described herein. In some examples, aspects of the operations of 1520 may be performed by a message analysis component as described with reference to FIGS. 9 through 11.

At 1525, the application server may input the subject line into the machine learned model. The operations of 1525 may be performed according to the methods described herein. In some examples, aspects of the operations of 1525 may be performed by a message analysis component as described with reference to FIGS. 9 through 11.

At 1530, the application server may receive, as an output of the machine learned model, an engagement score based on the subject line, where the engagement score indicates an estimated probability that a user receiving the communication message opens the communication message. The operations of 1530 may be performed according to the methods described herein. In some examples, aspects of the operations of 1530 may be performed by a scoring component as described with reference to FIGS. 9 through 11.

A method for communication message analysis using machine learning is described. The method may include receiving a set of social media messages including a set of respective message contents, performing a machine learning process on the set of respective message contents and message interaction data corresponding to the set of social media messages to generate a machine learned model, receiving a subject line for a communication message for analysis, inputting the subject line into the machine learned model, and receiving, as an output of the machine learned model, an engagement score based on the subject line, where the engagement score indicates an estimated probability that a user receiving the communication message opens the communication message.

An apparatus for communication message analysis using machine learning is described. The apparatus may include a processor, memory coupled with the processor, and instructions stored in the memory. The instructions may be executable by the processor to cause the apparatus to receive a set of social media messages including a set of respective message contents, perform a machine learning process on the set of respective message contents and message interaction data corresponding to the set of social media messages to generate a machine learned model, receive a subject line for a communication message for analysis, input the subject line into the machine learned model, and receive, as an output of the machine learned model, an engagement score based on the subject line, where the engagement score indicates an estimated probability that a user receiving the communication message opens the communication message.

Another apparatus for communication message analysis using machine learning is described. The apparatus may include means for receiving a set of social media messages including a set of respective message contents, performing a machine learning process on the set of respective message contents and message interaction data corresponding to the set of social media messages to generate a machine learned model, receiving a subject line for a communication message for analysis, inputting the subject line into the machine learned model, and receiving, as an output of the machine learned model, an engagement score based on the subject line, where the engagement score indicates an estimated probability that a user receiving the communication message opens the communication message.

A non-transitory computer-readable medium storing code for communication message analysis using machine learning is described. The code may include instructions executable by a processor to receive a set of social media messages including a set of respective message contents, perform a machine learning process on the set of respective message contents and message interaction data corresponding to the set of social media messages to generate a machine learned model, receive a subject line for a communication message for analysis, input the subject line into the machine learned model, and receive, as an output of the machine learned model, an engagement score based on the subject line, where the engagement score indicates an estimated probability that a user receiving the communication message opens the communication message.

Some examples of the method, apparatuses, and non-transitory computer-readable medium described herein may further include operations, features, means, or instructions for receiving, as an additional output of the machine learned model, one or more suggested changes to the subject line.

Some examples of the method, apparatuses, and non-transitory computer-readable medium described herein may further include operations, features, means, or instructions for receiving a user input indicating a suggested change of the one or more suggest changes to the subject line and updating the communication message to include an updated subject line based on the subject line and the suggested change.

In some examples of the method, apparatuses, and non-transitory computer-readable medium described herein, receiving, as the additional output of the machine learned model, the one or more suggested changes to the subject line further may include operations, features, means, or instructions for receiving one or more additional engagement scores corresponding to the one or more suggested changes to the subject line.

Some examples of the method, apparatuses, and non-transitory computer-readable medium described herein may further include operations, features, means, or instructions for receiving, as an additional output of the machine learned model, an indicated segmentation of the subject line into a set of portions and a respective indication of how each portion of the set of portions affects the engagement score for the subject line.

Some examples of the method, apparatuses, and non-transitory computer-readable medium described herein may further include operations, features, means, or instructions for sending, for display in a user interface of a user device, the engagement score.

Some examples of the method, apparatuses, and non-transitory computer-readable medium described herein may further include operations, features, means, or instructions for transmitting the communication message to one or more users, receiving, from at least one user of the one or more users, feedback information indicating user engagement with the communication message, and updating the machine learned model based on the feedback information.

In some examples of the method, apparatuses, and non-transitory computer-readable medium described herein, the user engagement with the communication message includes opening the communication message, replying to the communication message, forwarding the communication message, performing an action associated with the communication message, or a combination thereof.

In some examples of the method, apparatuses, and non-transitory computer-readable medium described herein, the engagement score may include a predicted user engagement score, and the method, apparatuses, and non-transitory computer-readable medium described herein may further include operations, features, means, or instructions for determining an actual user engagement score based on the feedback information, where the machine learned model may be updated based on a difference between the predicted user engagement score and the actual user engagement score.

In some examples of the method, apparatuses, and non-transitory computer-readable medium described herein, performing the machine learning process further may include operations, features, means, or instructions for determining an association between the set of respective message contents and the message interaction data corresponding to the set of social media messages, where the machine learned model may be based on the association.

Some examples of the method, apparatuses, and non-transitory computer-readable medium described herein may further include operations, features, means, or instructions for filtering a total set of social media messages to remove one or more outlier social media messages with message engagement data greater than a first threshold engagement amount or lower than a second threshold engagement amount, where the set of social media messages may be received from the filtered total set of social media messages.

In some examples of the method, apparatuses, and non-transitory computer-readable medium described herein, performing the machine learning process further may include operations, features, means, or instructions for training the machine learned model using a first subset of the set of social media messages and validating the machine learned model using a second subset of the set of social media messages.

In some examples of the method, apparatuses, and non-transitory computer-readable medium described herein, validating the machine learned model may include operations, features, means, or instructions for inputting respective message contents for each message of the second subset of social media messages into the machine learned model to obtain respective predicted message interaction data for each message of the second subset of social media messages, comparing the respective predicted message interaction data for each message of the second subset of social media messages to respective actual message interaction data corresponding to each message of the second subset of social media messages, and further training the machine learned model based on the comparing.

In some examples of the method, apparatuses, and non-transitory computer-readable medium described herein, receiving the set of social media messages further may include operations, features, means, or instructions for identifying a criterion for an account based on a number of other accounts connected to the account, a number of social media messages associated with the account, content of social media messages associated with the account, or a combination thereof, and selecting a set of accounts based on the criterion, where the set of social media messages may be received from the selected set of accounts.

In some examples of the method, apparatuses, and non-transitory computer-readable medium described herein, receiving the set of social media messages further may include operations, features, means, or instructions for identifying a first social media message of the set of social media messages with a highest message interaction rate and a second social media message of the set of social media messages with a lowest message interaction rate, where the first social media message and the second social media message correspond to a range for the engagement score.

In some examples of the method, apparatuses, and non-transitory computer-readable medium described herein, the set of social media messages may be received based on a set of users generating the set of social media messages, a common subset of message contents of the set of social media messages, the message interaction data corresponding to the set of social media messages, or a combination thereof.

In some examples of the method, apparatuses, and non-transitory computer-readable medium described herein, the message interaction data includes a number of shares, a number of responses, a number of views, or a combination thereof.

In some examples of the method, apparatuses, and non-transitory computer-readable medium described herein, the respective message contents includes text, a link, an emoticon, an image, or a combination thereof, the communication message includes an email message, and the subject line includes text, a link, or a combination thereof.

A method for communication message analysis is described. The method may include receiving a set of communication messages including a set of respective subject lines, performing a machine learning process on the set of respective subject lines and message open rate data corresponding to the set of communication messages to generate a machine learned model, receiving a communication message for analysis, the communication message including a subject line, inputting the subject line into the machine learned model, and receiving, as an output of the machine learned model, an engagement score based on the subject line, where the engagement score indicates an estimated probability that a user receiving the communication message opens the communication message.

An apparatus for communication message analysis is described. The apparatus may include a processor, memory coupled with the processor, and instructions stored in the memory. The instructions may be executable by the processor to cause the apparatus to receive a set of communication messages including a set of respective subject lines, perform a machine learning process on the set of respective subject lines and message open rate data corresponding to the set of communication messages to generate a machine learned model, receive a subject line for a communication message for analysis, input the subject line into the machine learned model, and receive, as an output of the machine learned model, an engagement score based on the subject line, where the engagement score indicates an estimated probability that a user receiving the communication message opens the communication message.

Another apparatus for communication message analysis is described. The apparatus may include means for receiving a set of communication messages including a set of respective subject lines, performing a machine learning process on the set of respective subject lines and message open rate data corresponding to the set of communication messages to generate a machine learned model, receiving a communication message for analysis, the communication message including a subject line, inputting the subject line into the machine learned model, and receiving, as an output of the machine learned model, an engagement score based on the subject line, where the engagement score indicates an estimated probability that a user receiving the communication message opens the communication message.

A non-transitory computer-readable medium storing code for communication message analysis is described. The code may include instructions executable by a processor to receive a set of communication messages including a set of respective subject lines, perform a machine learning process on the set of respective subject lines and message open rate data corresponding to the set of communication messages to generate a machine learned model, receive a subject line for a communication message for analysis, input the subject line into the machine learned model, and receive, as an output of the machine learned model, an engagement score based on the subject line, where the engagement score indicates an estimated probability that a user receiving the communication message opens the communication message.

Some examples of the method, apparatuses, and non-transitory computer-readable medium described herein may further include operations, features, means, or instructions for receiving, as an additional output of the machine learned model, a suggested change to the subject line.

Some examples of the method, apparatuses, and non-transitory computer-readable medium described herein may further include operations, features, means, or instructions for receiving a user input indicating the suggested change to the subject line, and automatically transmitting the communication message including an updated subject line based on the subject line and the suggested change to the subject line.

Some examples of the method, apparatuses, and non-transitory computer-readable medium described herein may further include operations, features, means, or instructions for sending, for display in a user interface, the engagement score.

Some examples of the method, apparatuses, and non-transitory computer-readable medium described herein may further include operations, features, means, or instructions for sending, for display in a user interface, a list of recently scored subject lines.

Some examples of the method, apparatuses, and non-transitory computer-readable medium described herein may further include operations, features, means, or instructions for transmitting the communication message to a user, receiving feedback information indicating whether the communication message may be opened by the user, and updating the machine learned model based on the feedback information.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication message analysis using machine learning, comprising:
   receiving a plurality of social media messages comprising a plurality of respective message contents and corresponding to respective interaction data indicating how users interact with a social media message on a social media platform;
   performing a machine learning process on the plurality of respective message contents and the respective interaction data corresponding to the plurality of social media messages to generate a machine learned model;
   receiving a subject line for a communication message for analysis;
   inputting the subject line into the machine learned model; and
   receiving, as an output of the machine learned model, an engagement score based at least in part on the subject line, wherein the engagement score indicates an estimated probability that a user receiving the communication message on an email platform different from the social media platform opens the communication message.

2. The method of claim 1, further comprising:
   receiving, as an additional output of the machine learned model, one or more suggested changes to the subject line.

3. The method of claim 2, further comprising:
   receiving a user input indicating a suggested change of the one or more suggested changes to the subject line; and
   updating the communication message to comprise an updated subject line based at least in part on the subject line and the suggested change.

4. The method of claim 2, wherein receiving, as the additional output of the machine learned model, the one or more suggested changes to the subject line further comprises:
receiving one or more additional engagement scores corresponding to the one or more suggested changes to the subject line.

5. The method of claim 1, further comprising:
receiving, as an additional output of the machine learned model, an indicated segmentation of the subject line into a plurality of portions and a respective indication of how each portion of the plurality of portions affects the engagement score for the subject line.

6. The method of claim 1, further comprising:
sending, for display in a user interface of a user device, the engagement score.

7. The method of claim 1, further comprising:
transmitting the communication message to one or more users;
receiving, from at least one user of the one or more users, feedback information indicating user engagement with the communication message; and
updating the machine learned model based at least in part on the feedback information.

8. The method of claim 7, wherein the user engagement with the communication message comprises opening the communication message, replying to the communication message, forwarding the communication message, performing an action associated with the communication message, or a combination thereof.

9. The method of claim 7, wherein the engagement score comprises a predicted user engagement score, the method further comprising:
determining an actual user engagement score based at least in part on the feedback information, wherein the machine learned model is updated based at least in part on a difference between the predicted user engagement score and the actual user engagement score.

10. The method of claim 1, wherein performing the machine learning process further comprises:
determining an association between the plurality of respective message contents and the respective interaction data corresponding to the plurality of social media messages, wherein the machine learned model is based at least in part on the association.

11. The method of claim 1, further comprising:
filtering a total set of social media messages to remove one or more outlier social media messages with message engagement data greater than a first threshold engagement amount or lower than a second threshold engagement amount, wherein the plurality of social media messages is received from the filtered total set of social media messages.

12. The method of claim 1, wherein performing the machine learning process further comprises:
training the machine learned model using a first subset of the plurality of social media messages; and
validating the machine learned model using a second subset of the plurality of social media messages.

13. The method of claim 12, wherein validating the machine learned model comprises:
inputting respective message contents for each message of the second subset of social media messages into the machine learned model to obtain respective predicted message interaction data for each message of the second subset of social media messages;
comparing the respective predicted message interaction data for each message of the second subset of social media messages to respective actual message interaction data corresponding to each message of the second subset of social media messages; and
further training the machine learned model based at least in part on the comparing.

14. The method of claim 1, wherein receiving the plurality of social media messages further comprises:
identifying a criterion for an account based at least in part on a number of other accounts connected to the account, a number of social media messages associated with the account, content of social media messages associated with the account, or a combination thereof; and
selecting a plurality of accounts based at least in part on the criterion, wherein the plurality of social media messages is received from the selected plurality of accounts.

15. The method of claim 1, wherein receiving the plurality of social media messages further comprises:
identifying a first social media message of the plurality of social media messages with a highest message interaction rate and a second social media message of the plurality of social media messages with a lowest message interaction rate, wherein the first social media message and the second social media message correspond to a range for the engagement score.

16. The method of claim 1, wherein the plurality of social media messages is received based at least in part on a set of users generating the plurality of social media messages, a common subset of message contents of the plurality of social media messages, the respective interaction data corresponding to the plurality of social media messages, or a combination thereof.

17. The method of claim 1, wherein the respective interaction data comprises a number of shares, a number of responses, a number of views, or a combination thereof.

18. The method of claim 1, wherein:
the plurality of respective message contents comprises text, a link, an emoticon, an image, or a combination thereof;
the communication message comprises an email message; and
the subject line comprises text, a link, or a combination thereof.

19. An apparatus for communication message analysis using machine learning, comprising:
a processor;
memory coupled with the processor; and
instructions stored in the memory and executable by the processor to cause the apparatus to:
receive a plurality of social media messages comprising a plurality of respective message contents and corresponding to respective interaction data indicating how users interact with a social media message on a social media platform;
perform a machine learning process on the plurality of respective message contents and the respective interaction data corresponding to the plurality of social media messages to generate a machine learned model;
receive a subject line for a communication message for analysis;
input the subject line into the machine learned model; and receive, as an output of the machine learned model, an engagement score based at least in part on the subject line, wherein the engagement score indicates an estimated probability that a user receiving the communication message on an email platform different from the social media platform opens the communication message.

20. A non-transitory computer-readable medium storing code for communication message analysis using machine learning, the code comprising instructions executable by a processor to:

receive a plurality of social media messages comprising a plurality of respective message contents and corresponding to respective interaction data indicating how users interact with a social media message on a social media platform;

perform a machine learning process on the plurality of respective message contents and the respective interaction data corresponding to the plurality of social media messages to generate a machine learned model;

receive a subject line for a communication message for analysis;

input the subject line into the machine learned model; and receive, as an output of the machine learned model, an engagement score based at least in part on the subject line, wherein the engagement score indicates an estimated probability that a user receiving the communication message on an email platform different from the social media platform opens the communication message.

* * * * *